United States Patent
Park et al.

(10) Patent No.: US 10,600,239 B2
(45) Date of Patent: Mar. 24, 2020

(54) REALISTICALLY ILLUMINATED VIRTUAL OBJECTS EMBEDDED WITHIN IMMERSIVE ENVIRONMENTS

(71) Applicant: ADOBE INC., San Jose, CA (US)

(72) Inventors: Jeong Joon Park, Seattle, WA (US); Zhili Chen, San Jose, CA (US); Xin Sun, San Jose, CA (US); Vladimir Kim, Seattle, WA (US); Kalyan Krishna Sunkavalli, San Jose, CA (US); Duygu Ceylan Aksit, San Jose, CA (US)

(73) Assignee: Adobe Inc., San Jose, CA (US)

( * ) Notice: Subject to any disclaimer, the term of this patent is extended or adjusted under 35 U.S.C. 154(b) by 5 days.

(21) Appl. No.: 15/877,142

(22) Filed: Jan. 22, 2018

(65) Prior Publication Data
US 2019/0228567 A1      Jul. 25, 2019

(51) Int. Cl.
*G06T 15/50*        (2011.01)
*G06T 19/00*        (2011.01)
*G06T 15/60*        (2006.01)

(52) U.S. Cl.
CPC ............ *G06T 15/506* (2013.01); *G06T 15/50* (2013.01); *G06T 15/60* (2013.01); *G06T 19/006* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2005/0276441 A1* | 12/2005 | Debevec | ............... | H04N 5/222 382/100 |
| 2014/0125668 A1* | 5/2014 | Steed | ..................... | G06T 15/50 345/426 |

OTHER PUBLICATIONS

Miika Aittala, "Inverse lighting and photorealistic rendering for augmented reality", Jun. 2010, Springer-Verlag, The Visual Computer, vol. 26, Issue 6-8, pp. 669-678.*

(Continued)

*Primary Examiner* — Robert Bader
(74) *Attorney, Agent, or Firm* — Shook, Hardy & Bacon, L.L.P.

(57) ABSTRACT

Matching an illumination of an embedded virtual object (VO) with current environment illumination conditions provides an enhanced immersive experience to a user. To match the VO and environment illuminations, illumination basis functions are determined based on preprocessing image data, captured as a first combination of intensities of direct illumination sources illuminates the environment. Each basis function corresponds to one of the direct illumination sources. During the capture of runtime image data, a second combination of intensities illuminates the environment. An illumination-weighting vector is determined based on the runtime image data. The determination of the weighting vector accounts for indirect illumination sources, such as surface reflections. The weighting vector encodes a superposition of the basis functions that corresponds to the second combination of intensities. The method illuminates the VO based on the weighting vector. The resulting illumination of the VO matches the second combination of the intensities and surface reflections.

20 Claims, 9 Drawing Sheets

(56) References Cited

OTHER PUBLICATIONS

Yoshinori Dobashi, Kazufumi Kaneda, Hideki Nakatani, Hideo Yamashita, Tomoyuki Nishita, "A Quick Rendering Method Using Basis Functions for Interactive Lighting Design", Aug. 1995, Blackwell Publishers, Computer Graphics Forum, vol. 14 Issue 3, pp. 229-240.*

Yizhou Yu, Paul Debevec, Jitendra Malik, Tim Hawkins, "Inverse Global Illumination: Recovering Reflectance Models of Real Scenes from Photographs", 1999, ACM, SIGGRAPH '99 Proceedings of the 26th annual conference on Computer graphics and interactive techniques, pp. 215-224.*

Takeshi Takai, Atsuto Maki, Koichiro Niinuma, Takashi Matsuyama, "Difference sphere: An approach to near light source estimation", Sep. 2009, Elsevier, Computer Vision and Image Understanding, vol. 113, Issue 9, pp. 966-978.*

Jeffry S. Nimeroff, Eero Simoncelli, Julie Dorsey, "Efficient Re-rendering of Naturally Illuminated Environments", Jun. 1994, Springer, In: Sakas G., Müller S., Shirley P. (eds) Photorealistic Rendering Techniques. Focus on Computer Graphics (Tutorials and Perspectives in Computer Graphics), pp. 373-388.*

Thorsten Grosch, Tobias Eble, Stefan Mueller, "Consistent Interactive Augmentation of Live Camera Images with Correct Near-field Illumination", Nov. 7, 2007, ACM, VRST '07 Proceedings of the 2007 ACM symposium on Virtual reality software and technology, pp. 125-132.*

Peter-Pike Sloan, Jan Kautz, John Snyder, "Preconnputed Radiance Transfer for Real-Time Rendering in Dynamic, Low-Frequency Lighting Environments", Jul. 26, 2002, ACM, SIGGRAPH '02 Proceedings of the 29th annual conference on Computer graphics and interactive techniques, pp. 527-536.*

Matthias Korn, Maik Stange, Andreas von Arb, Lisa Blum, Michael Kreil, Kathrin-Jennifer Kunze, Jens Anhenn, Timo Wallrath, and Thorsten Grosch, "Interactive Augmentation of Live Images using a HDR Stereo Camera", 2007, Journal of Virtual Reality and Broadcasting, vol. 4(2007), No. 12.*

Kai Rohmer, Wolfgang Büschel, Raimund Dachselt, Thorsten Grosch, "Interactive Near-Field Illumination for Photorealistic Augmented Reality on Mobile Devices", Sep. 12, 2014, IEEE, 2014 IEEE International Symposium on Mixed and Augmented Reality (ISMAR), pp. 29-38.*

Debevec, P. (Jul. 1998). Rendering synthetic objects into real scenes: Bridging traditional and image-based graphics with global illumination and high dynamic range photography. In Proceedings of the 25th annual conference on Computer graphics and interactive techniques (pp. 189-198). ACM.

Mang, E., Cohen, M. F., & Curless, B. (2016). Emptying, refurnishing, and relighting indoor spaces. ACM Transaction on Graphics (TOG), 35(6), 174.

* cited by examiner

REALISTICALLY ILLUMINATED VIRTUAL OBJECTS EMBEDDED WITHIN IMMERSIVE ENVIRONMENTS

BACKGROUND

Augmented reality (AR) technologies have been adopted in numerous applications, such as heads-up displays, mobile devices, and "smart" headwear and/or eyeglasses. AR typically involves embedding virtual objects (VOs) within a real-world physical scene. That is, AR refers to augmenting a user's physical reality by populating the user's view of an environment with one or more VOs. For instance, AR-enabled eyeglasses may provide holograms and/or projections of VOs onto transparent lenses included in the eyeglasses. A wearer may view their physical environment through the transparent lenses, while simultaneously viewing VOs embedded within their physical environment. Heads-up displays may similarly augment the user's reality, without the need for eyeglasses or headwear. For example, a vehicle may be equipped with a heads-up-enabled windshield. The driver may view virtualized versions of dashboard instruments or other VOs, without diverting their gaze from their windshield.

Mobile gaming applications have also widely adopted AR technologies. Users now routinely view, in real-time, image data captured by cameras embedded within their device, while a gaming application inserts VOs into the real-time image data displayed on their mobile display screens. Likewise, prior to purchasing a home furnishing item, such as furniture, a user may determine how the item will appear within a particular room within their home by employing AR eyeglasses or a display screen of a mobile device to embed a virtualized version of the item within a view of the room.

Although embedding VOs within a physical scene is now commonplace, oftentimes embedded virtual objects are not illuminated in a realistic manner. For example, conventional methods for embedding virtual objects may not consider the illumination sources included in the environment. Other conventional method may model the intensity of illumination sources as static and/or model the illumination sources as being infinitely far from the environment. Accordingly, the realism or naturalness of the virtual object may suffer.

SUMMARY

Embodiments of the present invention are directed towards providing an immersive experience to a user by illuminating an embedded virtual object (VO) to match the current illumination conditions of the embedding environment. One disclosed method includes determining a set of illumination basis functions for the embedding environment based on a preprocessing set of image data. When the preprocessing image data is captured, the embedding environment is illuminated by a first combination of intensities of a set of direct illumination sources. Each of the illumination basis function corresponds to one of the direct illumination sources of the set of direct illumination sources. A direct illumination source may be a light emitter, such as but not limited to a light bulb. A runtime set of image data is captured and/or received. During the capture of the runtime image data, the embedding environment is illuminated by a second combination of intensities of the set of direct illumination sources. The second combination of intensities may be equivalent to, similar to, or different from the first combination of intensities. The method further includes determining an illumination-weighting vector based on the runtime set of image data and the illumination basis functions. The illumination-weighting vector encodes a superposition of the set of basis functions that corresponds to the second combination of intensities of the direct illumination sources. The method may embed a virtual object (VO) within the embedding environment. The method illuminates the embedded VO based on the illumination-weighting vector. The illumination of the illuminated VO corresponds to or matches the second combination of the intensities of the set of direct illumination sources.

The method may additionally include generating a three-dimensional (3D) model of the environment based on the preprocessing image data and associating an albedo (or optical reflectance) value with each pixel of the preprocessing image data based on the 3D model of the environment. A particular albedo value associated with a particular pixel indicates an optical reflectance at a particular location on a surface of the environment that maps to the particular pixel based on the 3D map. The method further determines a set of illumination values that encodes the first combination of intensities of the set of direct illumination sources based on the 3D map, each albedo value associated with the pixels of the preprocessing image data, and illumination values of the pixels of the preprocessing image data. The method may then determine the set of basis functions based on the determined set of illumination values.

In some embodiments, the method includes determining an optical-path value for each direct illumination source and the particular pixel based on the 3D map, as well as determining the first combination of intensities of the set of direct illumination sources further based on each determined optical-path value. Each optical-path value may be based on a distance between the corresponding direct illumination source and the particular location on the surface of the environment that maps to the particular pixel. In some embodiments, each illumination value of the set of illumination values is a direct illumination value. The method may further include determining an indirect illumination value for each pixel of the first set of image data. The indirect illumination value for the particular pixel is based on combination of iterative estimates of each direct illumination value in the set of direct illumination values. The set of direct illumination values may be iteratively determined based on the indirect illumination values and the iterative estimates of the direct illumination values.

In another embodiment, a virtual shadow is generated and embedded within the embedding environment. The virtual shadow is based on a 3D shape of the VO and the illumination of the illuminated VO. Each basis function of the set of basis functions may include another set or frame of image data that depicts the environment illuminated only by the corresponding direct illumination source and without a contribution from an indirect illumination source and other direct illumination sources of the set of direct illumination sources. Each of the direct illumination sources is a point illumination source located at a particular position within the environment.

DETAILED DESCRIPTION

Figure 1A:
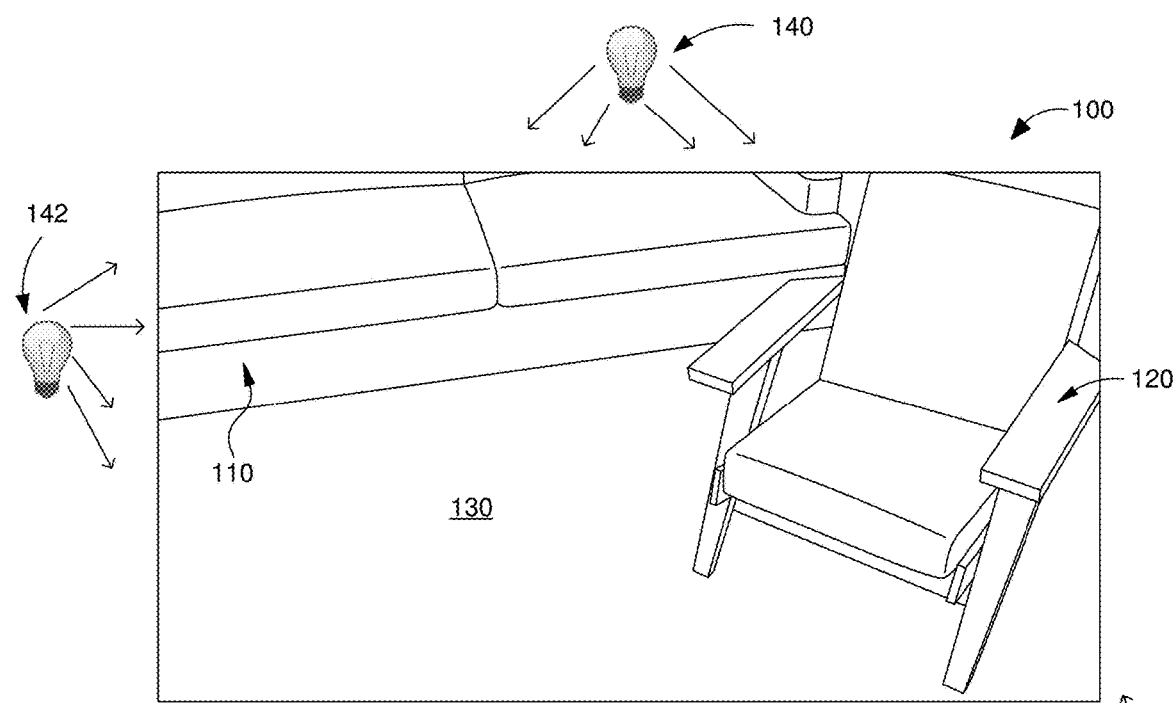
FIG. 1A illustrates an exemplary embedding environment that is consistent with the embodiments herein.

As used herein, the terms "embedding environment," or "target scene" may be used interchangeably to refer to the physical or virtual environment in which one or more virtual objects (VOs) are to be embedded and/or inserted within. The terms the "apparent illumination," or simply the "illumination" of a VO refers to the color values and intensity values of the display pixels or display surfaces that are employed to embed a VO within the embedding environment, wherein the color/intensity values encode a display that matches the illumination conditions of the embedding environment. More particularly, the apparent illumination refers to the color and illumination pixel values, such that when embedded within the embedding environment, the color and intensity of the VO appears, to the user, to match a corresponding physical object illuminated by the current illumination conditions of the embedding environment.

As used herein, the terms "albedo value," or "albedo" of a physical or virtual surface may refer to a measure or indication of the visible-light reflectance of the surface. In some embodiments, the albedo of a physical or a virtual surface may indicate the ratio of the reflected irradiance to the received irradiance of a surface. As used herein, irradiance refers to the radiant flux (or power) received/reflected by a surface per unit area. Thus, a surface approximated as a "white body" (e.g., an ideal mirror) would have an albedo value of approximately 1.0, while another surface approximated as a "black body," would have an albedo value of approximately 0.0. As used herein, the "viewing location" of the viewer or user refers to at least the approximate three-dimensional (3D) location, with respect to the embedding environment, of the viewer's eyes. That is, the viewing location may be indicated by one or more points (or volume of points) within the embedding environment.

As used herein, the term "combination" may refer to a selection of k choices from n possibilities, where k is a non-negative integer, n is a positive integer, and k<n. Thus, in some embodiments, the value of k may be 0. In other embodiments, the value of k may be 1. In still other embodiments, the value of k may be greater than 1, depending on the value of n. Accordingly, the phrase "combination of intensities" may refer to one or more (or zero) intensities.

In some embodiments, a combination of intensities may refer to a single intensity (or zero intensities) from the set of n direct illumination sources. In other embodiments, a combination of intensities refers to multiple intensities from the set of n direct illumination sources. Similarly, a "combination of basis images" may refer to a selection of one or more basis images. As used herein, a set may refer to a "null" set.

Briefly stated, various embodiments realistically illuminate VOs that are embedded within immersive environments, such as but not limited to augmented reality (AR) environments or virtual reality (VR) environments. More specifically, the embodiments match the illumination of a VO to the current and/or real time illumination conditions of the embedding environment. That is, the embodiments generate and embed VOs that appear to be illuminated by the current (direct and indirect) conditions of the illumination sources present in the embedding environment. The embodiments accomplish such realistic and real-time illumination of a VO by determining, via a preprocessing stage, basis functions of the embedding environment that correspond to the separate illumination sources. During the runtime stage, the embodiments monitor the current illumination conditions, determine a weighting vector based on the current illumination conditions, and illuminate the VO by recombining the basis functions based on the weighting vector. Some embodiments generate and embed virtual shadows cast by the realistically illuminated VOs.

As discussed further below, the embodiments herein address shortcomings in conventional methods of illuminating VOs. Such conventional methods are limited in their ability to model the illumination sources. For instance, some conventional methods model the illumination sources as being infinitely far from the embedding environment. Some conventional methods do not included indirect illumination sources, while others are not able to match the real-time illumination conditions of the embedding environment. As discussed throughout, the various embodiments address such shortcomings.

For instance, in contrast to conventional methods, the apparent illumination of the VOs is matched with the current (i.e., real time) illumination conditions of the embedding environment. In further contrast to some conventional methods, the illumination conditions of the embedding environment may include both the conditions or intensities of direct illumination sources positioned within the embedding environment, as well as conditions or intensities of indirect illumination sources, i.e., the reflection of the direct illumination sources from physical and/or virtual surfaces within the embedding environment. Accordingly, the embedded VOs of the various embodiments appear more realistic and natural, as compared to conventional embedded VOs, at least because the apparent illumination of the VOs of the embodiments herein may match both the current direct and the current indirect illumination sources of the embedding environment.

In the embodiments, the illumination conditions of the embedding environment may be monitored in real time. As the illumination conditions of the embedding environment are varied, the apparent illumination of the embedded VOs is updated in real time, such that the apparent illumination of the VOs continues to match the varying illumination conditions of the embedding environment. For instance, in response to a variance in the intensity of one or more illumination sources, or a variance in the viewpoint of the user, the apparent illumination of the VOs is varied to match the current illumination conditions.

In some embodiments, virtual shadows may be generated and embedded within the immersive environment. That is, shadows that would be cast if the VOs were optically opaque physical objects, are generated based on the illumination conditions of the embedding environment. The appearance of the VOs, as well as any generated virtual shadows, may be varied in real time as the illumination conditions of the embedded environment and/or viewpoint of the user are varied. As such, the embodiments provide naturalistic and immersive user experiences, as the embedded VOs represent physical objects that are realistically illuminated, in real time, by the illumination conditions of the embedding environment. As indicated throughout, the illumination conditions of the embedding environment may refer to both direct and indirect illumination sources.

Direct illumination sources include emitters of visible electromagnetic waves or photons (i.e., light) within the embedding environment. That is, direct illumination sources generate and emit visible light. For instance, direct illumination sources may include lightbulbs, lamps, display screens, natural sunlight, or any other light-emitting objects or sources. As discussed below, and in contrast to direct illumination sources, indirect illumination sources include the reflections of visible light from the physical and/or virtual surfaces of the embedding environment. That is, indirect illumination sources reflect, rather than generate and emit, visible light.

In various embodiments herein, a direct illumination source may be considered as a point source. That is, a unique geometric point in the embedding environment may indicate the location of a direct illumination source. In contrast to conventional methods of embedding VOs, the direct illumination sources herein may be positioned within the embedding environment. That is, unlike conventional methods, direct illumination sources need not be modeled as being located infinitely far away, relative to the embedding environment. For example, the direct illumination sources herein may be located at a 3D geometric point within the embedded environments, wherein each of the corresponding Cartesian coordinates employed to locate the direct illumination source are definite, finite, and significantly less than infinite.

In further contrast to conventional methods of embedding VOs, the direct illumination conditions of the embedding environment need not be constant in time. That is, the color (i.e., visible wavelengths and/or frequencies) and intensity of the direct illumination sources need not be constant in time. Also in contrast to conventional methods, the viewing location of the viewer or user need not be constant in time.

As indicated above, the indirect illumination sources of the illumination conditions include the reflections of the direct illumination sources from at least partially reflective (physical and/or virtual) surfaces included in the embedding environment. That is, the indirect illumination sources include reflections from the real or physical surfaces within the embedding environment with non-zero albedo values. In some embodiments, the indirect illumination sources may include reflections from virtual surfaces embedded within the embedding environment.

The apparent illumination of a VO may be dependent on both the direct and indirect illumination conditions of the embedded environment. The direct and indirect illumination conditions of the embedding environment vary as each of the color and intensity of the direct illumination sources vary, as well as the viewing location of the viewer. Thus, as used herein, the illumination conditions of the embedding environment refers to the intensity and colors of each of the direct illumination sources, as well as the viewing location of the viewer. More specifically, the direct illumination conditions are based on at least one of the color of one or more direct illumination sources, the intensity of the one or more direct illumination sources, or the viewing location. The indirect illumination conditions may be determined based on the direct illumination conditions, as well as a geometry and a reflectance (or albedo value) of the physical and/or virtual surfaces of the embedding environment. The current illumination of a VO may be determined based the current direct illumination conditions and the current indirect illumination conditions, i.e., the current illumination conditions of the embedding environment.

The various embodiments include a preprocessing stage and a runtime stage. During the preprocessing stage, an inverse rendering of the embedding environment is generated and the illumination conditions of the embedding environment are separated into direct and indirect components. That is, the illumination conditions are represented as a combination of illumination components associated with each of the direct illumination sources. During the runtime stage, the current illumination conditions are monitored, and the current combination or superposition of illumination components that represents or encodes the current illumination conditions is determined in real time. The VOs are generated such that the apparent illumination of the VOs match the current combination of illumination components. In various embodiments, virtual shadows may be generated based on at least the 3D geometry or shape of the VOs and the physical objects within the embedding environment, as well as the current combination of illumination components.

More specifically, during the preprocessing stage, a 3D model of the embedding environment is generated. To generate the 3D model, preprocessing image data of the embedding environment is captured. At least a portion of the preprocessed image data may be captured with a depth sensor and/or 3D camera. In at least some embodiments, the preprocessing image data may include data encoding frequencies outside the visible spectrum. For instance, an infrared (IR) depth-sensing 3D camera may be employed to capture preprocessing image data the enables the determination of the 3D model or map. In various embodiments, preprocessing image data may include image data from multiple viewpoint locations. In some embodiments, the preprocessing image data includes image data from enough varied viewpoint locations within the embedding environment to generate a 3D model or map of the embedding environment.

The 3D model of the embedding environment enables the mapping of each pixel of (preprocessing and runtime) image data of the embedding environment to a 3D physical location, or set of points, within the embedding environment. More specifically, the 3D model maps each pixel of image data to a set of 3D coordinates that corresponds to at least a portion of a surface, within the embedding environment, wherein the surface that is mapped to the pixel includes a non-zero albedo value.

During the runtime stage, as the viewing location is updated, the 3D model is employed to map each of the runtime image data pixels to a corresponding 3D location on an at least partially reflective surface within the embedding environment. That is, a 3D model of the embedding environment is generated such that at least the 3D geometry of the embedding environment is inversely rendered during the preprocessing stage.

Also during the preprocessing stage, the direct and indirect lighting conditions, within the preprocessing image data, are separated or partitioned. That is, for the preprocessing image data, the observed illumination (color values and intensity values for the pixels) are partitioned into direct illumination components and indirect illumination components. The direct illumination components can be further partitioned into components associated with each of the direct illumination sources. Accordingly, for each of the direct illumination sources, a portion of the (direct and indirect) illumination observed in the preprocessing image data that corresponds to the explicit illumination source is determined. Each of these illumination portions are employed as an illumination basis function.

More specifically, a finite set of direct illumination sources provide direct and indirect illumination on the embedding environment. During the preprocessing stage, for each particular direct illumination source of the set of direct illumination sources, an encoding and/or representation of the direct illumination, generated by the particular direct illumination source, of the embedding environment is determined. The total (direct and indirect) illumination of the embedding environment may be encoded and/or represented via a superposition of the illumination basis functions representing the corresponding direct illumination sources.

For instance, for each direct illumination source, a corresponding frame (or frames) of image data of the embedding environment, based on the preprocessing image data, is generated. The illumination of the frame of image data appears as if only the corresponding direct illumination source is illuminating the embedding environment. In some embodiments, the albedo of physical surface points may be determined, as well as the direct illumination source intensities based on this frame of image data. In other embodiments, the albedo of each surface of the embedding environment is identically zero. That is, the frame of image data for a corresponding direct illumination source (i.e., the corresponding illumination basis function) appears as if the embedding environment is illuminated by only the corresponding illumination source, and no indirect illumination occurs. This frame of image data serves as an illumination basis function for the corresponding direct illumination source. The direct and indirect illumination of the preprocessing image data (or any other image data of the embedding environment) may be generated based on an appropriate linear superposition of the illumination basis functions. That is, a linear combination of the illumination basis functions are employed to generate both the direct and indirect illumination conditions of the embedding environment. The total illumination of the embedding environment is generated based on a linear combination of the direct and indirect illumination.

During the runtime state, the illumination conditions of the embedding environment are monitored via the capturing of image data of the embedding environment. The specific combination, or superposition, of the illumination basis functions that matches the monitored illumination conditions can be determined in the form of an illumination-weighting vector. Each component of the illumination-weighting vector includes a relative weight for a corresponding direct illumination source. Thus, the illumination-weighting vector encodes the superposition of the illumination basis functions that at least approximates the current illumination conditions of the embedding environment.

The illumination-weighting vector and the illumination basis functions can be employed to generate the superposition of the illumination basis functions. In turn, the illumination basis functions may be employed to determine and/or generate the apparent illumination of VOs embedded within the embedding environment. As discussed herein, the linear combination of the illumination weighting functions that represents, or encodes, the illumination conditions of the embedding environment may be referred to the "superposition of the illumination basis functions," or simply, the "illumination superposition." Accordingly, the illumination weighting vector and the illumination basis functions may encode the illumination superposition.

As the illumination conditions are varied, the illumination-weighting vector is updated to reflect the current illumination conditions. The superposition of the illumination basis functions and the apparent illumination of the VOs are updated based on the updated illumination-weighting vector. As noted above, in various embodiments, virtual shadows may be embedded within the embedding environment based on the illumination-weighting vector, the illumination basis functions, and the geometry of the VO surfaces, as well as the geometry of the physical surfaces of the embedding environment.

Example Illumination of Virtual Objects

FIG. 1A illustrates an exemplary embedding environment 100 that is consistent with the embodiments herein. Embedding environment 100 includes a physical sofa 110, a physical chair 120, and a physical floor 130. Other embedding environments may include more or fewer physical objects than that depicted within FIG. 1A. Embedding environment 100 is being illuminated via three direct illumination sources: a first direct illumination source 140, a second direct illumination source 142, and a third direct illumination source 144. Other embedding environments may be illuminated with more or fewer direct illumination sources. Each of the three direct illumination sources is located within embedding environment 100, and may be considered point sources. In other embodiments, the assumption that the direct illumination sources are point sources may be relaxed. That is, the direct point sources may be considered as areas or volumes of illumination sources.

Figure 1B:
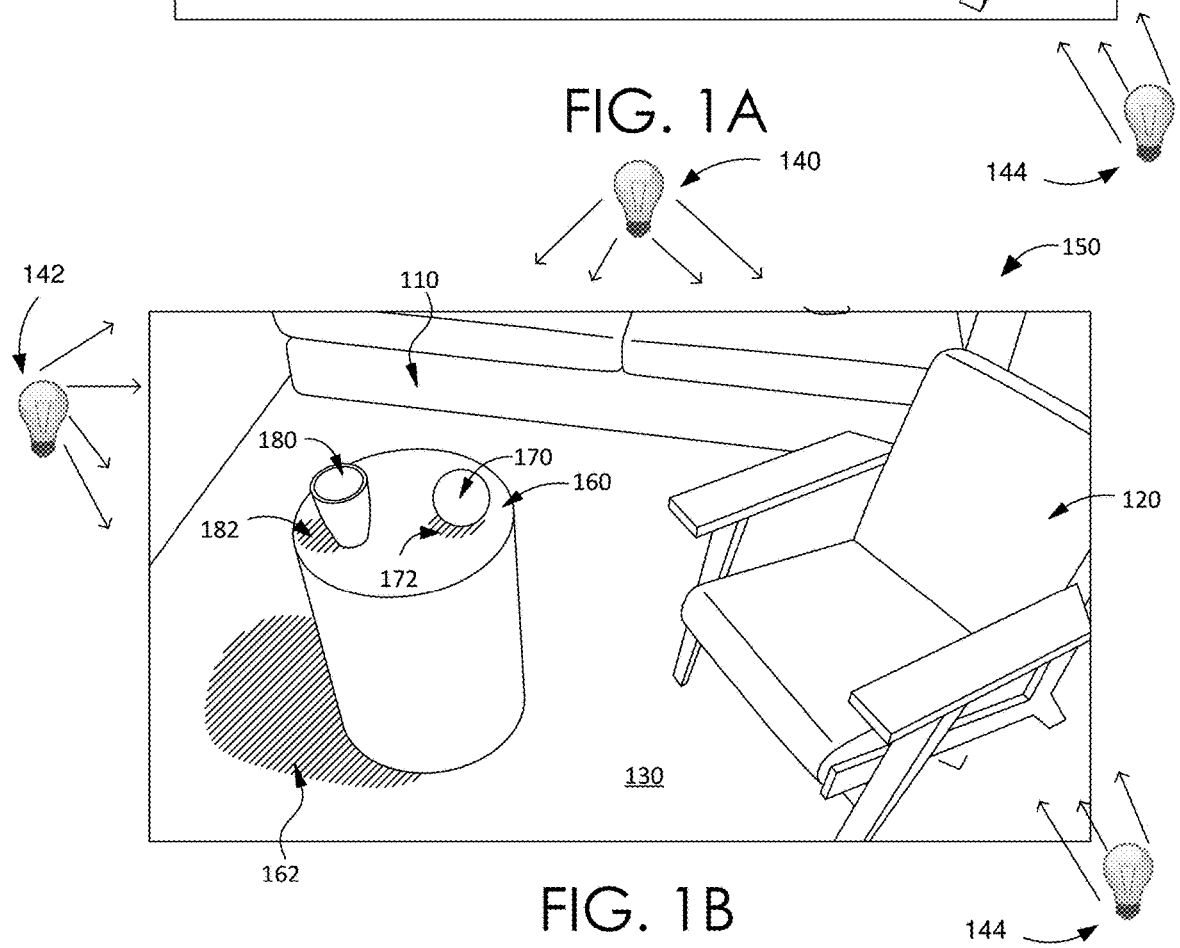
FIG. 1B illustrates an augmented environment that is consistent with the embodiments herein.

FIG. 1B illustrates an augmented environment 150 that is consistent with the embodiments herein. More specifically, augmented environment 150 includes the embedding environment 100 of FIG. 1A, with three embedded virtual objects (VOs): virtual table 160, virtual sphere 170, and virtual cup 180, where the virtual sphere 170 and the virtual cup 180 are sitting on top of the virtual table 160. The apparent illumination (color and intensity) of the pixels depicting the virtual table 160, virtual sphere 170, and the virtual cup 180 is such that each of the VOs appear to be illuminated by the direct illumination sources 140/142/144, as well as the indirect illumination sources due to the reflection of visible light from the surfaces of the physical sofa 110, physical chair 120, and the physical floor 130.

Augmented environment 150 also includes three virtual shadows: first virtual shadow 162, second virtual shadow 172, and third virtual shadow 182. The optically opaque virtual table 160 casts the first virtual shadow 162. The optically opaque virtual sphere 170 casts the second virtual shadow 172. The optically opaque virtual cup 180 casts the third virtual shadow 182. Each of the virtual shadows 162/172/182 are generated based on each of the direct illumination sources 140/142/144 and the indirect illumination sources, i.e., reflections from the surfaces of the physical sofa 110, the physical chair 120, and the physical floor 130 that include non-zero albedo values. The three virtual shadows 162/172/182 are virtual objects. Note that the viewing location in FIG. 1B is varied from the viewing location of FIG. 1A. Thus, the illumination conditions in FIG. 1A and FIG. 1B are varied.

As shown in FIG. 1A, embedding environment 100 is a real or physical environment at least because physical sofa 110, physical chair 120, and physical floor 130 are real, physical, and tangible objects. For instance, a view may view embedding environment 100 and augmented environment 150 through AR-enabled eyeglasses 212 of FIG. 2. In other embodiments, embedding environment 100 may be a virtual embedding environment. For instance, sofa 110, chair 120, and floor 130 may be virtual objects. As an example, a user may view or observe a virtual embedding environment through a VR headset, such as but not limited to VR headset 214 of FIG. 4. Whether the embedding environment is a real environment, a virtual environment, or a combination of a real/physical environment and a virtual environment, the various embodiments may generate and embed VOs with an apparent illumination that matches the monitored and/or observed direct and indirect illumination sources.

Example Operating Environment

Figure 2:
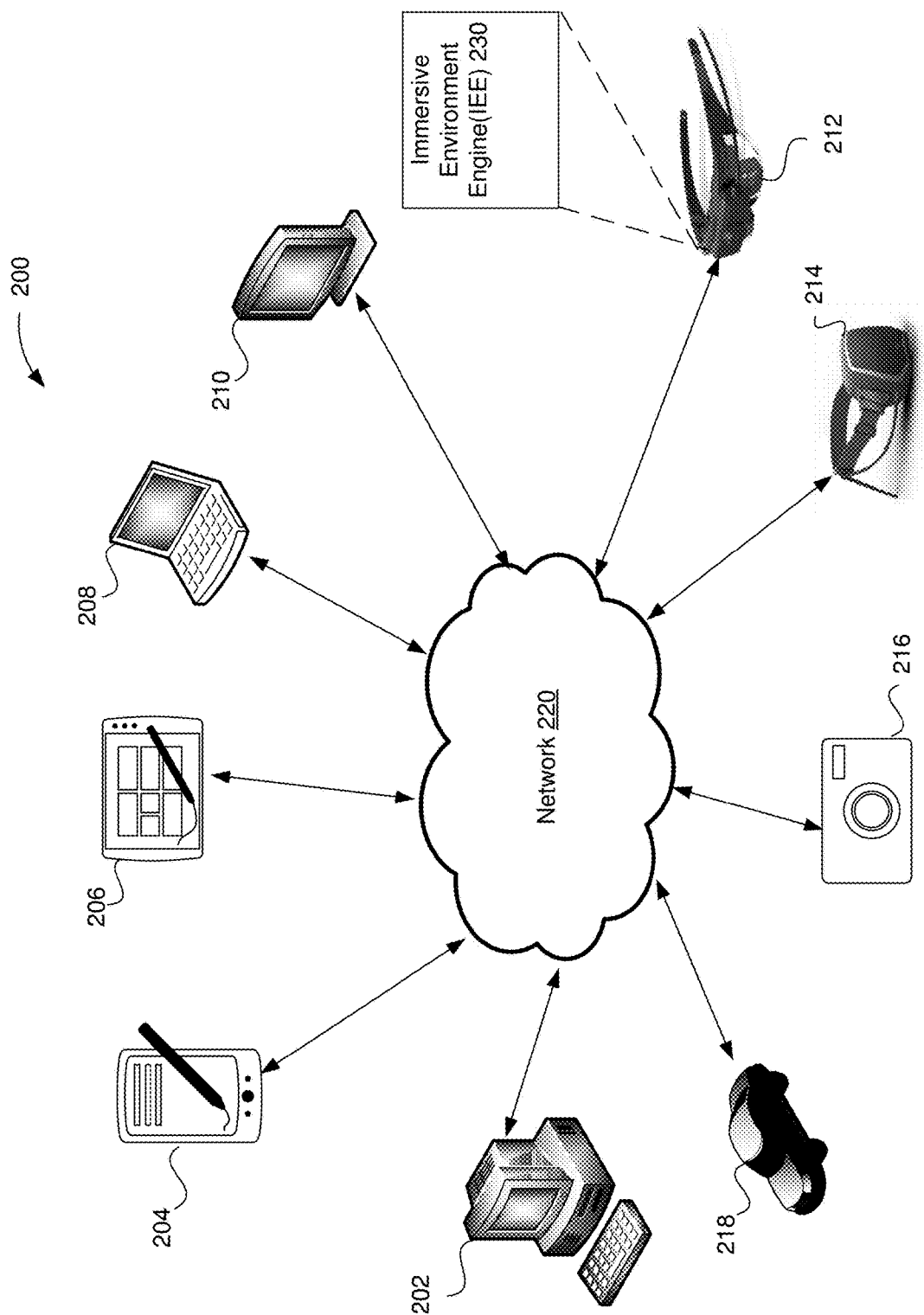
FIG. 2 illustrates a system for implementing various embodiments presented herein.

FIG. 2 illustrates a system 200 for implementing various embodiments presented herein. System 200 includes one or more of various user-computing devices, such as but not limited to desktop 202, smartphone 204, tablet 206, laptop 208, heads-up display 210, augmented reality (AR)-enabled eyeglasses 212, and virtual reality (VR) headset 214, digital camera 216, and heads-up enabled vehicles 218. Other embodiments may include additional and/or alternative user computing devices. In other embodiments, system 200 may include more or less user computing devices. For instance, system 200 may include additional mobile devices, wearable devices, and the like. An exemplary, but non-limiting embodiment of a user-computing device is discussed in conjunction with at least computing device 900 of FIG. 9. That is, at least structures, functionalities, or features of computing device 900 may be included in any of user computing devices 202-214 and/or server computing device 216. At noted throughout, any of user-computing devices 202-214 may include one or more image sensing devices, or cameras, to capture both preprocessing image data and runtime image data, as discussed herein.

Any user computing device, such as but not limited to user-computing devices 202-218 may be enabled to provide a user with an immersive experience that includes one or more virtual objects (VOs) with apparent illumination matching the direct and indirect illumination conditions of the embedding environment, as discussed herein. To enable providing such an immersive experience, any of user-computing devices 202-218 may include an immersive environment engine (IEE), such as but not limited to IEE 230. For example, FIG. 2 shows AR-enabled eyeglasses 212 hosting IEE 230. Various embodiments of an IEE are discussed in conjunction with at least IEE 300 of FIG. 3.

A general or specific communication network, such as but not limited to communication network 220, may communicatively couple at least a portion of user-computing devices 202-218. Communication network 220 may be any communication network, including virtually any wired and/or wireless communication technologies, wired and/or wireless communication protocols, and the like. Communication network 220 may be virtually any communication network that communicatively couples a plurality of computing devices and databases in such a way as to computing devices to exchange information via communication network 220.

Example Immersive Environment Engine

Figure 3:
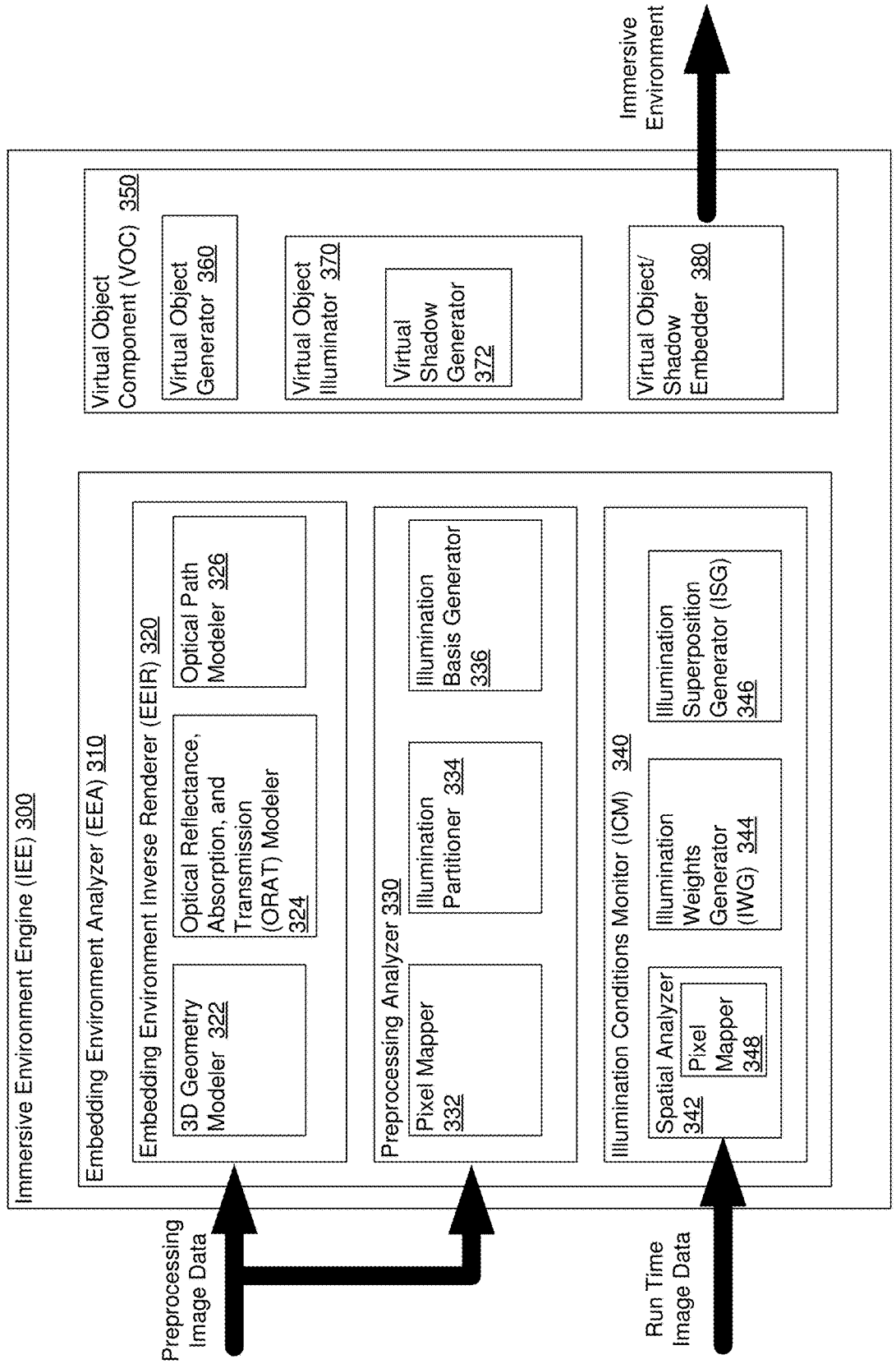
FIG. 3 illustrates one non-limiting embodiment of an immersive environment engine (IEE) that is consistent with the embodiments herein.

FIG. 3 illustrates one non-limiting embodiment of an immersive environment engine (IEE) 300 that is consistent with the embodiments herein. IEE 300 enables providing a user an immersive environment, such as but not limited to an augmented reality (AR) environment and/or a virtual reality (VR) environment. More specifically, IEE 300 is enabled to generate and embed one or more virtual objects (VOs) within an embedding environment. The embedding environment may be a real embedding environment, such as one that would be observed or viewed via AR-enabled eyeglasses 212 or heads-up display device 210 of FIG. 2. In other embodiments, the embedding environment may be a virtual environment, such as one that would be observed or viewed in VR headset 214 of FIG. 2. For instance, IEE 300 is enabled to embed virtual table 160, virtual sphere 170, and virtual cup 180 of FIG. 1A, in embedding environment 100 of FIG. 1A. The embedded VOs may include virtual shadows, such as but not limited first, second, and third virtual shadows 162/172/182 of FIG. 1B. That is, IEE 300 can generate an augmented environment, such as but not limited to augmented environment 150 of FIG. 1B. IEE 300 is further enabled to generate and embed VOs, such that the apparent illumination of a VO matches the current illumination conditions of the embedding environment, as discussed herein.

As such, IEE 300 may include an embedding environment analyzer (EEA) 310 and a virtual object component (VOC) 350. EEA 310 is generally responsible for analyzing the embedding environment and/or determining the illumination conditions of the embedding environment. More specifically, EEA 310 monitors the embedding environment and partitions the illumination conditions into direct and indirect illumination sources, as discussed throughout. VOC 350 is generally responsible for generating a VO, illuminating the VO based on the partitioned indirect and indirect illumination sources, and embedding the illuminated VO within the embedding environment. Thus, VOC 350 provides an immersive environment to the user, such as but not limited to an AR environment or a VR environment. VOC 350 may also generate and embed virtual shadows based on illumination conditions of the embedding environment. The VO's apparent illumination and the virtual shadows match the monitored illumination conditions of the monitored embedding environment.

EEA 310 may include an embedding environment inverse renderer (EEIR) 320, a preprocessing analyzer 330, and an illumination conditions monitor (ICM) 340. EEIR 320 and preprocessing analyzer 330 generally operate in the preprocessing stages of the various embodiments, while ICM 340 provides functionality during the runtime stage. EEIR 320 is generally responsible for generating a three-dimensional (3D) inverse rendering of the embedding environment. That is, EEIR 320 generates a 3D model of the embedding environment, as well as an optical path model and a reflectance model of the embedding environment. Preprocessing analyzer 330 is generally responsible for partitioning the initial illumination conditions of the embedding environment into direct and indirect illumination sources and generating illumination basis functions based on the partitioned illumination sources. That is, preprocessing analyzer 330 may generate an illumination basis function for each of the direct illumination sources that are illuminating the embedding environment. ICM 340 is generally responsible for monitoring the illumination conditions of the embedding environment during runtime, determining the illumination-weighting vector for the current illumination conditions, and generating the superposition of the illumination functions (i.e., the illumination superposition) that encodes the current illumination conditions based on the illumination-weighting vector and the basis functions.

VOC 350 operates in the runtime stage to generate one or more VOs, illuminates the VOs based on the illumination superposition, and imbeds the illuminated VOs within the embedding environment. VOC 350 may further generate and embed virtual shadows within the embedding environment based on the 3D models and the illumination superposition.

As shown in FIG. 3, to generate the inverse rendering of the embedding environment, EEIR 320 may receive preprocessing and/or initial image data. EEIR 320 may include and/or employ at least one of a 3D geometry modeler 322, optical reflectance, absorption, and transmission (ORAT) modeler 324, and an optical path modeler 326. 3D geometry modeler 322 may employ the preprocessing image data to generate the 3D model of the embedding environment. 3D geometry modeler 322 may employ various machine vision methods to analyze the preprocessing image data and generate a 3D model of the surfaces and objects included in the embedding environment. As discussed, at least a portion of the preprocessing image data may be captured and/or generated by one or more 3D and/or depth sensing camera devices to enable the generation of a 3D model of the embedding environment.

By applying machine vision methods to the preprocessing image data, including depth perception methods, 3D geometry modeler 322 generates and/or determines a 3D model or map of an embedding environment, such as but not limited to embedding environment 100 of FIG. 1A. The preprocessing image data may include image data from multiple viewpoint locations such that the 3D geometry modeler 322 is enabled to generate the 3D model of the embedding environment. The 3D model can include enough information such that each pixel of received image data can be mapped to a 3D location of a non-zero albedo valued surface within the embedding environment.

In some embodiments, the 3D model is discretized. That is, each geometric point or location within the embedding environment is associated with a spatial index. For instance, the spatial index may be referred to as spatial index i. Each particular spatial index i is mapped to a contiguous volume of points within the embedding environment. In a non-limiting embodiment, each spatial index i is mapped to a unique location within the embedding environment, wherein the location is defined by a volume or area of points and the size of the volume or area is based on the spacing of a 3D mesh or grid discretizing the embedding environment. For instance, spatial index i may indicate a unique set of 3D coordinates (e.g., Cartesian coordinates) that map to the location (or spatial bin) within the embedding environment.

Optical reflectance, absorption, and transmission (ORAT) modeler 324 may generate an optical reflectance (or albedo) model, an optical absorption model, and an optical transmission model for the embedding environment based on the 3D model of the embedding environment. That is, for each location within embedding, an optical albedo value ($\rho$), an optical absorption value ($\mu$), and an optical transmission value (T) is determined. In the various embodiments, the albedo value for a particular location may indicate the ratio of the reflected irradiance to the received irradiance on the particular location. The absorption value for the particular location may indicate the ratio of the absorbed irradiance to the received irradiance on the particular location. Similarly, the transmission value for the particular location may indicate the ratio of the transmitted irradiance to the received irradiance on the particular location. In some embodiments, the albedo value, the absorption value, and the transmission value indicate a statistical probability or likelihood that a photon incident on the particular location is reflected, absorbed, or transmitted, respectively. In some embodiments, $\rho(\vec{x})+\mu(\vec{x})+T(\vec{x})\approx 1$, where $\vec{x}$ is an arbitrary point in the embedding environment.

Thus, for locations in the embedding environment that are approximated as free space, $T\approx 1$. For locations that approximate a white body (such as the surface of an ideal mirror), $\rho\approx 1$. For locations that approximate a black body, $\mu\approx 1$. For spatially discretized embodiments, the spatial index i may be employed. That is, ORAT modeler 324 determines optical models (OM): $\{\rho_i, \mu_i, T_i\}$, for each i. As discussed herein, OM may refer to the set of optical models determined by ORAT modeler 324. The optical models may be based on the preprocessing image data, as well as various assumptions regarding the embedding environment.

In other embodiments, the 3D model and optical models are simpler. For instance, the 3D model may include a set of 2D curved and/or planar surfaces embedded within the 3D embedding environment. A corresponding albedo value is determined for each discretized location on the set of surfaces. As discussed below, the optical path modeler models the transmission of light between locations on the surfaces within the embedding environment. Optical path modeler 326 may model the transmission of light between two non-occluded arbitrary locations on the set of surfaces with a transmission loss model, such as but not limited to a $r^{-2}$ transmission loss model. For instance, the transmission of light may be modeled such that the spaces between surfaces perfectly transmit light with no scattering or absorption.

More specifically, optical path modeler 326 generates an optical path model between each pair of locations within the embedding environment based on the 3D model and the optical models. The optical path model includes a scalar-valued optical path function $F(\vec{x},\vec{y})$, where $\vec{x}$ and $\vec{y}$ are points or locations within the embedding environment. The value of $F(\vec{x},\vec{y})$ indicates the ratio of irradiance received at location $\vec{y}$ to a unit of irradiance transmitted from location $\vec{x}$. Thus, the range of $F(\vec{x},\vec{y})$ is [0,1]. Note that $F(\vec{x},\vec{y})=F(\vec{y},\vec{x})$. If one or more opaque or reflective surfaces occlude the transmission of light transmitted from $\vec{x}$ to $\vec{y}$, $F(\vec{x},\vec{y})=0.0$. In addition to occluding surface, the optical path function accounts for transmission losses due to the distance between $\vec{x}$ and $\vec{y}$. As mentioned above, in various embodiments, an $r^{-2}$ loss model is assumed when generating the optical transmission model.

In the spatially discretized embodiments, the optical path model or function may be indexed via two spatial indexes i and j: $F_{i,j}$. In some embodiments, optical path modeler 326 generates the optical path function determining the accumulated product of the optical transmission model along the optical path between the locations indicated by spatial indexes: i and j, e.g., $F_{i,j} \approx \Pi_{k \in i,j\,path} T_k$, where k is a spatial index that includes each location along the optical path between the i and j locations. In other embodiments, the determination of the optical path function is simplified, via methods that employ geometric ray tracing that account for occluding surfaces and transmission losses. That is, in some embodiments, it may be assumed that free space between reflective surfaces perfectly transmits light without scattering or absorptive losses.

As shown in FIG. 3, to generate the illumination basis functions, preprocessing analyzer 330 receives the preprocessing image data. Preprocessing analyzer 330 may include and/or employ at least one of a pixel mapper 332, an illumination partitioner 334, and an illumination basis generator 336. In the various embodiments, pixel mapper 332 may map each pixel of image data, including preprocessing image data, to a 3D location within the embedding environment based on the 3D model. For instance, pixel mapper 332 may map each pixel of preprocessing image data to a location on a surface in the embedding environment. Pixels may be indexed via pixel index i. Based on the albedo model and the mapping of pixels to 3D locations on surfaces in the embedding environment, pixel mapper 332 may associate and/or map an albedo value ($\rho_i$) to the pixel of the image data that is indexed by pixel index i. The image data may be preprocessing or initial image data.

As discussed throughout, illumination or intensity pixel values observed within image data may include the intensity and/or color values of each pixel within image data. Thus, the illumination of any individual image data pixels may include one or more intensity or illumination values that encode intensity and/or color of the pixel. Based on the definition of the albedo value, the apparent illumination values of a pixel may be modeled as the product of the albedo value and the irradiance incident on the surface that is mapped to the pixel via the 3D model of the embedding environment. The irradiance incident on the surface is the superposition or combination of the both the direct and indirect illumination sources incident on the surface.

In the various embodiments, there is a finite set of direct illumination sources. Furthermore, the number of direct illumination sources included in the set of direct illumination sources is known or assumed. Each direct illumination source may include a light emitter that is considered or assumed as a point source. Furthermore, at least the approximate 3D location of each direct illumination source is known or assumed. The direct illumination sources may be referenced via an illumination index j. The illumination values generated by the jth direct illumination source, at their 3D location that the jth direct illumination source may be referenced as $L_j$. $L_j$ may be referred to as the initial (direct) illumination value or initial intensity value of the jth direct illumination source. When referring to one or more frames of image data, including preprocessing image data, the pixels may be indexed via a pixel index i. As noted throughout, as used herein, the illumination values of a pixel may refer to the final color value of the pixel. Employing the above notation, approximate illumination values (i.e., the color values) for the ith pixel ($\hat{I}_i$) may be determined as $$\hat{I}_i = \rho_i \left( \sum_j L_j F_{i,j} + \tilde{I}_i \right),$$

where $\rho_i$ is the albedo value that maps to the ith pixel via pixel mapper 332 and $\tilde{I}_i$ is the indirect illumination that is illuminating the location on the surface of the embedding environment that maps to the ith pixel via pixel mapper 332.

Illumination partitioner 334 partitions the illumination of each pixel of the preprocessing image data into direct and indirect illumination. The indirect illumination value of the ith pixel ($\tilde{I}_i$) is the integration over all the reflections of the direct illumination sources. That is, the solid angle "viewable" to ith pixel may be integrated over. At a generalized location $\vec{p}$, within the embedding environment, the indirect illumination value may be determined as $$\tilde{I}(\vec{p}) = \int_\Omega L(\omega) \cos(\theta) d\omega = \int_\Omega L(\omega) \cos(\theta) \sin(\pi) d\theta d\pi.$$

In the various embodiments, illumination partitioner 334 is enabled to partition the illumination conditions of the preprocessing image data into direct and indirect sources. In the various embodiments, the illumination value (i.e., the color value) of the ith pixel of preprocessing image data is indicated as $I_i$. Based on illumination values of the preprocessing image data ($I_i$), illumination partitioner 334 is enabled to minimize the following expression, to determine each $L_j$:

$$\min_{L_j} \sum_i \left[ I_i - \hat{I}_i \right]^2,$$

where the summation is over the pixels of the preprocessing image data.

In the various embodiments, an additional albedo model may be included. This additional albedo model may assume that locations of embedding environment surfaces are associated with similar albedo values. The albedo-coupling strength between locations on surfaces within the embedding environment may be indicated as $w_{ij}$, where i and j are indexes that indicate generated locations within the embedding environment. In the various embodiments, the illumination partitioner 334 is enabled to update the albedo values based on minimizing the following expression:

$$\min_{L_j, \rho_i} \sum_i \left[ I_i - \rho_i \left( \sum_j L_j F_{ij} + \tilde{I}_i \right) \right]^2 + \sum_{i,j \in p} w_{ij} (\rho_i - \rho_j)^2,$$

where the minimization optimization may be performed over each of $L_j$ and $\rho_i$.

Accordingly, illumination partitioner 334 may be enabled to determine and/or updates values for $L_j$ (the illumination or intensity values) and $\rho_i$ for all i and j by determining the values that minimize the above expression. That is, illumination partitioner 334 may be enabled to minimize the above expression to find the set of initial direct illumination or intensity values $\{L_j\}$ for each j.

Illumination basis generator 336 is primarily responsible for generating an illumination basis function for each of the direct illumination sources based on the initial illumination or intensity values ($L_j$) determined by the illumination partitioner 334. As discussed herein, the illumination basis function for the jth direct illumination source may be referenced as $\beta_j$. In various embodiments, a basis function for the jth direct illumination source includes a rendering of the embedding environment, based on the preprocessing image data. The illumination of the embedding environment in the basis function image data appears as if only the jth direct illumination is providing direct illumination to the embedding environment. There is no indirect illumination of the embedding environment.

Figure 4:
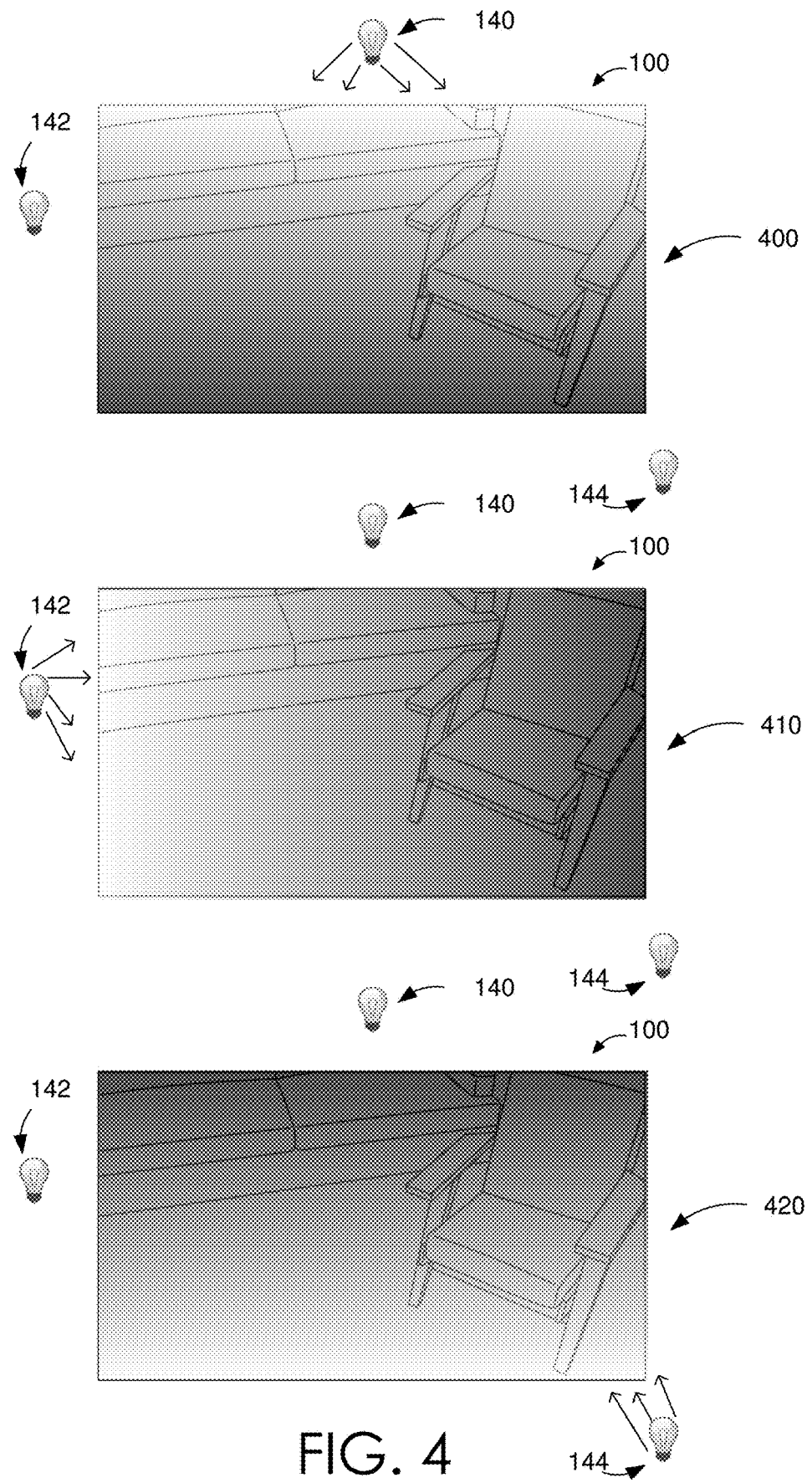
FIG. 4 shows three non-limiting examples of illumination basis functions for the embedding environment of FIG. 1A.

FIG. 4 shows three non-limiting examples of illumination basis functions 400, 410, and 420 for the embedding environment 100 of FIG. 1A. Note that these illumination basis functions include renderings or image data depicting the embedding environment illuminated by only the corresponding direct illumination source or light emitter. The first illumination basis function 400 is for and/or corresponds to the first direct illumination source 140 directly illuminating embedding environment 100. The second illumination basis function 410 is for and/or corresponds to the second direct illumination source 142 directly illuminating embedding environment 100. The third illumination basis function 420 is for and/or corresponds to the third direct illumination source 144 directly illuminating embedding environment 100. Each basis function shows how the environment would look if only the corresponding direct light was enabled. In some embodiments, there can still be indirect illumination due to this direct light since physical points can reflect the light they receive from this light source. When the basis functions are combined, the preprocessing image data, which includes both direct and indirect illumination, may be recovered. So the basis functions may implicitly include the indirect illumination. However, in at least one alternative embodiment, there is no indirect illumination sources illuminating the embedding environment in the illumination basis functions 400/410/420. First illumination basis function 400 may be referenced as $\beta_1$, second illumination basis function 410 may be referenced as $\beta_2$, and third illumination basis function 420 may be referenced as $\beta_3$. An illumination basis matrix (B) may be generated comprising of column vectors of the illumination basis functions $\beta_j$.

The first illumination basis function 400 includes a frame of image data of the embedding environment with illumination values for each of the pixels that appear as if only the first direct illumination source 140 is illuminating the embedding environment 100, as indicated from the illumination rays radiating from the first direct illumination source 140. Note that the second direct illumination source 142 and the third direct illumination source 144 do not appear to be illuminating the pixels of the first illumination basis function 400, as indicated by the lack of illumination rays radiating from each of the second direct illumination source 142 and the third direct illumination source 144.

The second illumination basis function 410 includes a frame of image data of the embedding environment with illumination values for each of the pixels that appear as if only the second direct illumination source 142 is illuminating the embedding environment 100, as indicated from the illumination rays radiating from the second direct illumination source 142. Note that the first direct illumination source 140 and the third direct illumination source 144 do not appear to be illuminating the pixels of the second illumination basis function 410, as indicated by the lack of illumination rays radiating from each of the first direct illumination source 140 and the third direct illumination source 144.

The third illumination basis function 420 includes a frame of image data of the embedding environment with illumination values for each of the pixels that appear as if only the third direct illumination source 144 is illuminating the embedding environment 100, as indicated from the illumination rays radiating from the third direct illumination source 144. Note that the first direct illumination source 140 and the second direct illumination source 142 do not appear to be illuminating the pixels of the second illumination basis function 410, as indicated by the lack of illumination rays radiating from each of the first direct illumination source 140 and the second direct illumination source 142.

Illumination basis generator 336 is enabled to generate an illumination basis function for each of the direct illumination sources based on the preprocessing image data, as well as the illumination values ($L_j$) and albedo values ($\rho_i$) as determined via the embodiments discussed throughout. The set of determined illumination values ($L_j$) encodes the combination of intensities of the direct illumination sources that were illuminating the embedding environment when the image data was captured. The set of illumination values may be a set of direct illumination values, where there is a one to one correspondence between each direct illumination value of the set of direct illumination values and the direct illumination sources, i.e. the light emitters. The illumination basis functions 400, 410, and 420 may be generated based on the determined set of illumination values. For instance, the illumination basis functions 400, 410, and 420 of FIG. 4 may be generated based on the preprocessing image data shown in FIG. 1A, as well as illumination values and albedo values determined by illumination partitioner 334. Illumination basis generator 336 may be enabled to generate the illumination basis matrix B.

As noted above, ICM 340 may monitor the runtime illumination conditions of the environment, as well as to determine the runtime or current illumination-weighting vector and generate the superposition of the illumination basis functions (i.e., the illumination superposition) based the monitored illumination conditions. As such, ICM 340 may include a spatial analyzer 342, an illumination weights generator (IWG) 344, and an illumination superposition generator (ISG) 346. Spatial analyzer 342 may receive runtime image data. Spatial analyzer 342 may map each pixel of the runtime image data to a location on a surface within the embedding environment based on the 3D map. In some embodiments, spatial analyzer 342 may include another pixel mapper 346 that maps the pixels of the runtime image data to the 3D locations of the embedding environment. Pixel mapper 348 may be similar to pixel mapper 332 of preprocessing analyzer 330. Accordingly, pixel mapper 348 may map or associate an albedo value to each pixel of the runtime image data. The albedo value mapped to the pixel is the albedo value of the location of the surface of the embedding environment that is mapped to the pixel. In other embodiments, spatial analyzer 340 may employ the pixel mapper 332 of the preprocessing analyzer 330, rather than including a separate pixel mapper 348.

IWG 344 generates the illumination-weighting vector ($\vec{w}$), based on the runtime image data, the albedo values mapped to the pixels of the image data, and the illumination basis functions. In some embodiments, IWG 344 determined the illumination-weighting vector components by finding the vector components such that $\vec{w}^T B$ most closely matches the illumination conditions of the runtime image data, based on the albedo values mapped to the runtime image data pixels and the illumination value of the runtime image pixels. ISG 346 generates the illumination superposition based on the weighting vector. That is, ISG 346 determines $\vec{w}^T B$. Note that the illumination superposition may be a row vector that encodes the illumination values for each pixel in image data.

To generate, illuminate, and embed virtual objects and virtual shadows within the embedding environment, VOC 350 may include a virtual object generator 360, and virtual object illuminator 370, and a virtual object/shadow embedder. Virtual object generator 360 may generate a VO. Various embodiments may be employed to generate a VO.

Virtual object illuminator 370 may illuminate the generated VO. For instance, virtual object illuminator 370 may employ the illumination values included in the illumination superposition ($\vec{w}^T B$) to determine the pixel values (color and/or intensity) of the pixels that correspond to the VO. Virtual object illuminator 370 may include a virtual shadow generator 372. Virtual shadow generator 372 is enabled to generate a virtual shadow based on the 3D shape of the VO and the illumination of the VO. Virtual object/shadow embedder 380 is enabled to embed the VO and the virtual shadow within the embedding environment. That is, the illuminated VO and virtual shadow may be out to a device, such as but not limited to AR-enabled eyeglasses 212 of FIG. 2, such that a user may employ the device to experience the VO and virtual shadow embedded in their environment.

Generalized Processes for Providing Device Graph Services

Processes 500-800 of FIGS. 5-8 will now be discussed. Processes 500-800, or portions thereof, may be performed and/or executed by any computing device, such as but not limited to user computing devices 202-218 of FIG. 2, as well as computing device 900 of FIG. 9. Additionally, an immersive environment engine (IEE), such as but not limited to IEE 230 of FIG. 2 and/or IEE 300 of FIG. 3, may perform and/or execute at least portions of processes 500-800.

Figure 5:
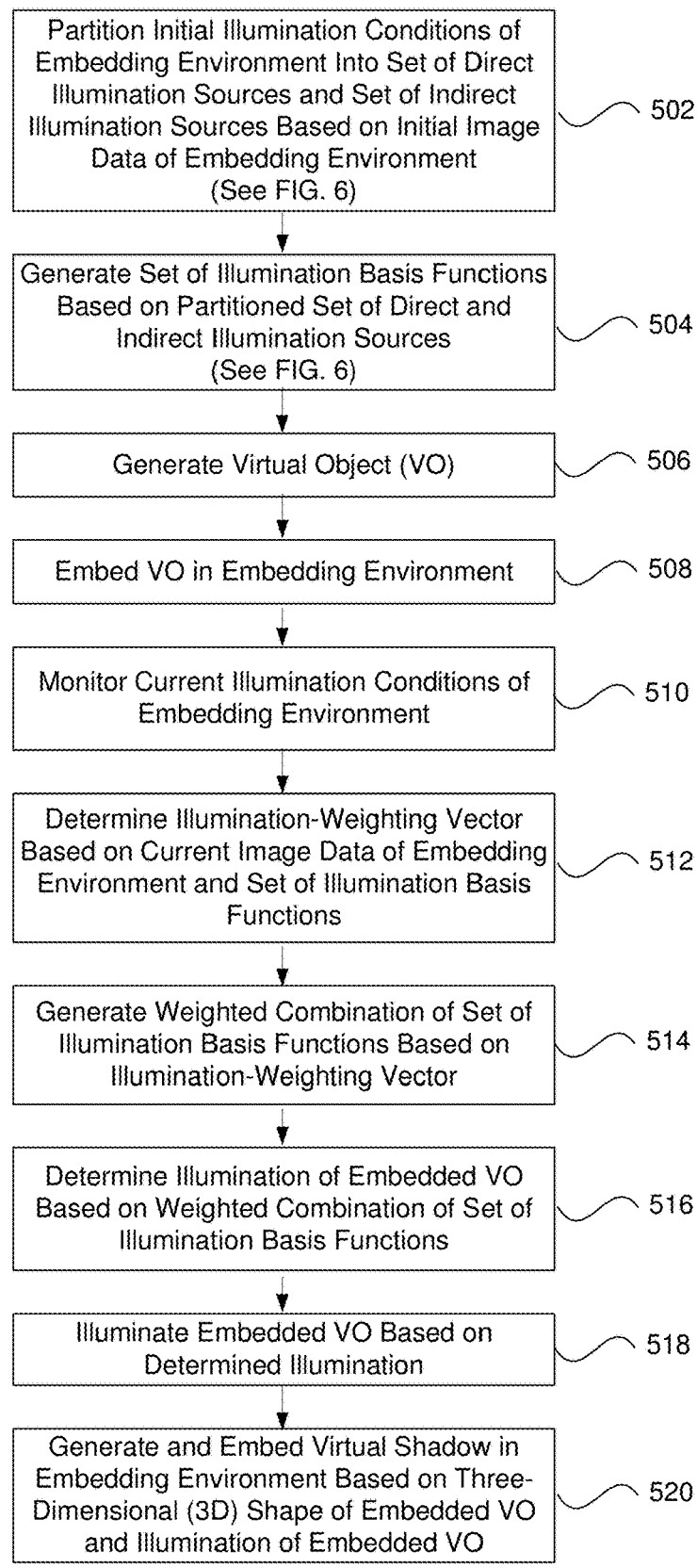
FIG. 5 illustrates one embodiment of a process flow for providing an immersive experience to a user that is consistent with the various embodiments presented herein.

FIG. 5 illustrates one embodiment of a process flow for providing an immersive experience to a user that is consistent with the various embodiments presented herein. Process 500 begins at block 502, where the initial illumination conditions of an embedding environment are partitioned into a set of direct illumination sources and a set of indirect illumination sources. The initial illumination conditions may be partitioned based on initial and/or preprocessing image data of the embedding environment. Various embodiments of partitioning illumination conditions are discussed in conjunction with at least process 600 of FIG. 6, embedding environment inverse renderer (EEIR) 320 of FIG. 3, and preprocessing analyzer 330 of FIG. 3. However, briefly here, each direct illumination source of the set of direct illumination sources may include a light emitter positioned within the embedding environment. For example, FIG. 1A shows a set of direct illumination sources that includes three light emitters 140/142/144 that are positioned within and illuminating embedding environment 100. The set of indirect illumination sources may include optical light reflections of light emitted by the set of direct illumination sources from reflective surfaces included in the embedding environment.

At block 504, a set of illumination basis functions are generated based on the partitioned set of direct and indirect illumination sources. Various embodiments of generating a set of illumination basis functions are discussed in conjunction with at least process 600 of FIG. 6, embedding environment inverse renderer (EEIR) 320, and preprocessing analyzer 330. However, briefly here, each illumination basis function of the set of illumination basis functions may include a basis image or basis image data. In some embodiments, each basis image depicts the environment illuminated by light emitted from a corresponding light emitter of the set of direct illumination sources. For instance, FIG. 4 depicts three illumination basis functions 400, 410, and 420.

At block 506, a virtual object (VO) is generated. Virtual object generator 360 of FIG. 3 may generate the VO. At block 508, the VO is embedded within the embedding environment. The virtual object/shadow embedder 380 of FIG. 3 may embed the generated VO within the embedded environment. For instance, FIG. 1B shows three virtual objects 160/170/180 embedded within embedding environment 100. At block 510, the current illumination conditions of the embedding environment are monitored. Various embodiments for monitoring the current illumination conditions of the embedding environment are discussed in conjunction with at least illumination conditions monitor (ICM) 340 of FIG. 3. In some embodiments, monitoring the current illumination conditions of the embedding environment may include capturing and/or receiving runtime and/or current image data of the embedding environment.

At block 512, an illumination-weighting vector is determined based on the current image data of the embedding environment and the set of illumination basis functions. Various embodiments for determining and/or generating an illumination-weighting vector are discussed in conjunction with illumination weights generator (IWG) 344 of FIG. 3. However, briefly here, each component of the illumination-weighting vector indicates and/or encodes a weight corresponding to one of the illumination basis functions associated with the current illumination conditions.

At block 514, a weighted combination of the set of illumination basis functions based on the illumination-weighting vector. Various embodiments of generating a weighted combination of the set of illumination basis functions are discussed at least in conjunction with illumination superposition generator (ISG) 346 of FIG. 6. However, briefly here, the weighted combination of the set of illumination basis functions may include a linear superposition of the illumination basis functions, where the components of the illumination-weighting vector are employed as the linear superposition coefficients.

At block 516, the illumination of the embedded VO is determined based on the weighted combination of the set of illumination basis functions. Various embodiments for determining the illumination of the embedded VO are discussed in conjunction with at least virtual object illuminator 370 of FIG. 3. However, briefly here, color and/or intensity values for pixels and/or surfaces depicting the embedded VO may be determined based on the pixel values associated with the weighted combination of the set of illumination basis functions. That is, illumination values for the VO may be determined based on the weighted illumination superposition. At block 518, the embedded VO is illuminated based on the determined illumination values. Virtual object illuminator 370 may illuminate the VO based on the determined illumination values.

At block 520, a virtual shadow is generated and embedded within the embedding environment based on a three-dimensional (3D) shape of the VO. Virtual shadow generator 372 of FIG. 3 may generate the virtual shadow based on the 3D shape of the VO and the illumination values for the VO. Virtual object/shadow embedder 380 may embed the virtual shadow within the embedding environment. For example, FIG. 1B shows three virtual shadows 162/172/182, based on the illumination values and 3D shapes of corresponding VOs 160/170/180.

Figure 6:
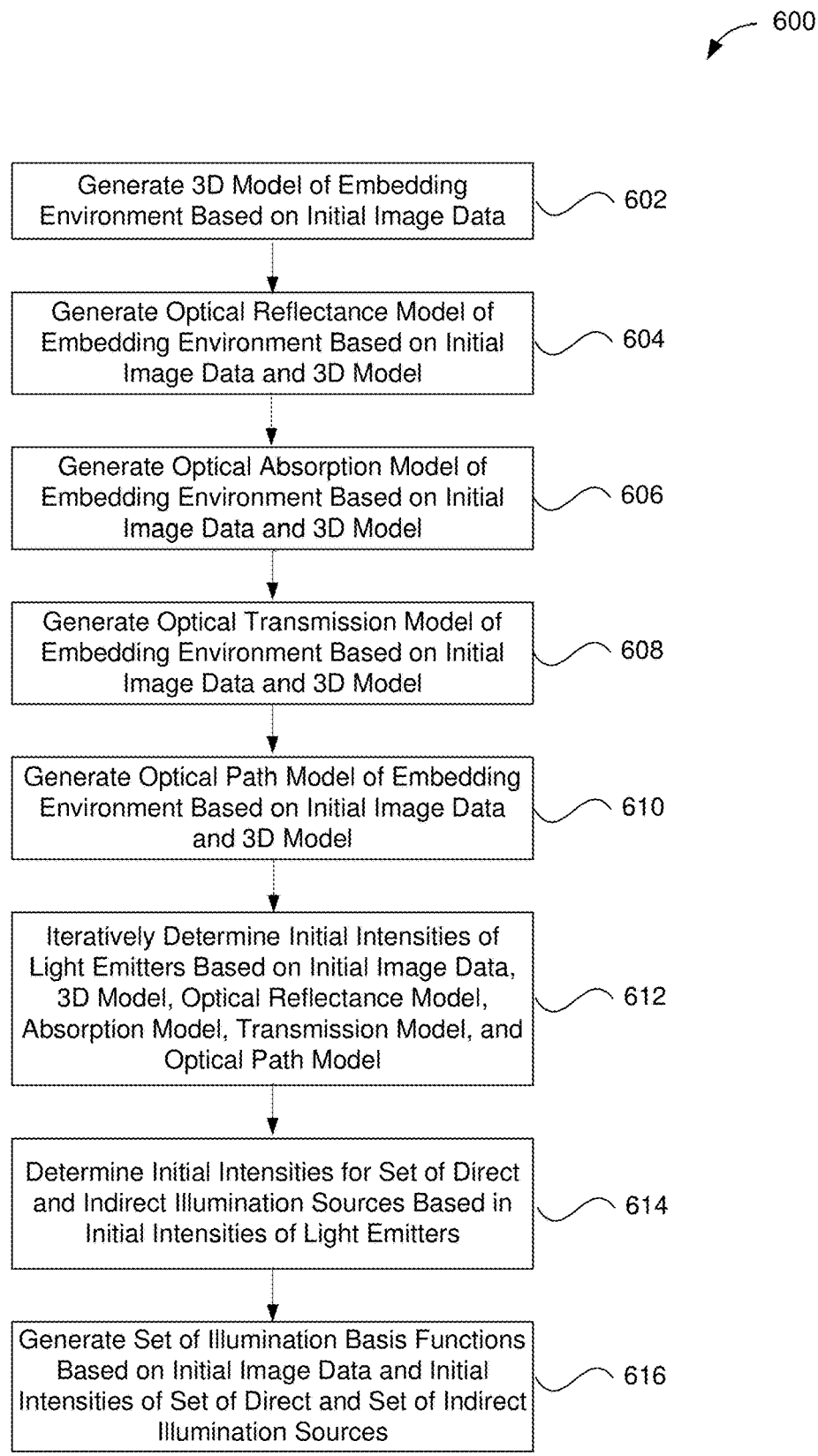
FIG. 6 illustrates one embodiment of a process flow for partitioning the illumination conditions of an embedding environment into direct and indirect illumination sources that is consistent with the various embodiments presented herein.

FIG. 6 illustrates one embodiment of a process flow for partitioning the illumination conditions of an embedding environment into direct and indirect illumination sources that is consistent with the various embodiments presented herein. Process 600 begins at block 602, where a 3D model of the embedding environment is generated based on initial and/or preprocessing image data. Various embodiments for generating a 3D model of the embedding environment are discussed in conjunction with at least 3D geometry modeler 322 of FIG. 3. However, briefly here, the 3D model enables a mapping of each pixel of the initial image data to a 3D location on a reflective, or non-zero albedo valued, surface in the environment.

At block 604, an optical reflectance model of the embedding environment is generated based on the initial image data and the 3D model. Various embodiments of generating a reflectance, or albedo, model of the embedding environment are discussed in conjunction with at least ORAT modeler 324 of FIG. 3. However, briefly here, the reflectance model (or albedo, model) associates an albedo value with each pixel of the initial image data. The albedo value for a particular pixel indicates an optical reflectance of the particular location on the reflective surface that the particular pixel is mapped to based on the 3D model.

At block 606, an optical absorption model of the environment may be generated based on the initial image data and the 3D model. At block 608, an optical transmission model of the environment may be generated based on the initial image data and the 3D model. Various embodiments for generating optical absorption and optical transmission models are discussed in conjunction with at least ORAT modeler 324.

At block 610, an optical path model for the embedding environment is generated based on the initial image data and the 3D model. Various embodiments for generating an optical path model are discussed in conjunction with at least optical path modeler 326. However, briefly here, the optical path model maps, or associates, a distance between each direct illumination source and the locations on the reflective surfaces of the environment.

At block 612, initial intensities of the light emitters of the direct illumination sources are iteratively determined. In various embodiments, the initial intensities may be determined based on the initial image data, the 3D model, the optical reflection/albedo model, the optical absorption model, the optical transmission model, and the optical path model. Various embodiments for iteratively determining the initial intensities or intensity values for the light emitters are discussed in conjunction with at least pixel mapper 332 and illumination partitioner 332 of FIG. 3. However, briefly here, for each pixel of the initial image data, a direct illumination contribution or value is iteratively determined based on at least the albedo value associated with the pixel, the optical path model, and a summation over the light emitters of the direct illumination sources. For each pixel of the initial image data, an indirect illumination value or contribution is iteratively determined based on the albedo value associated with the pixel and a summation over solid angles to determine the optical reflections from surfaces. For each pixel, the iteratively determined direct and indirect illumination values are combined and compared to the observed pixel values of initial image data.

At block 614, the initial intensity values for the set of direct illumination sources and initial intensity values for the set of indirect illumination sources are discussed in conjunction with at least illumination partitioner 332.

At block 616, the set of illumination basis functions are determined based on the initial image data. The set of illumination basis functions may additionally be based on the initial intensity values of the set of direct and the initial intensity values of the set of indirect illumination sources. Various embodiments for generating illumination basis functions are discussed in conjunction with at least illumination basis generator 336 of FIG. 3.

Figure 7:
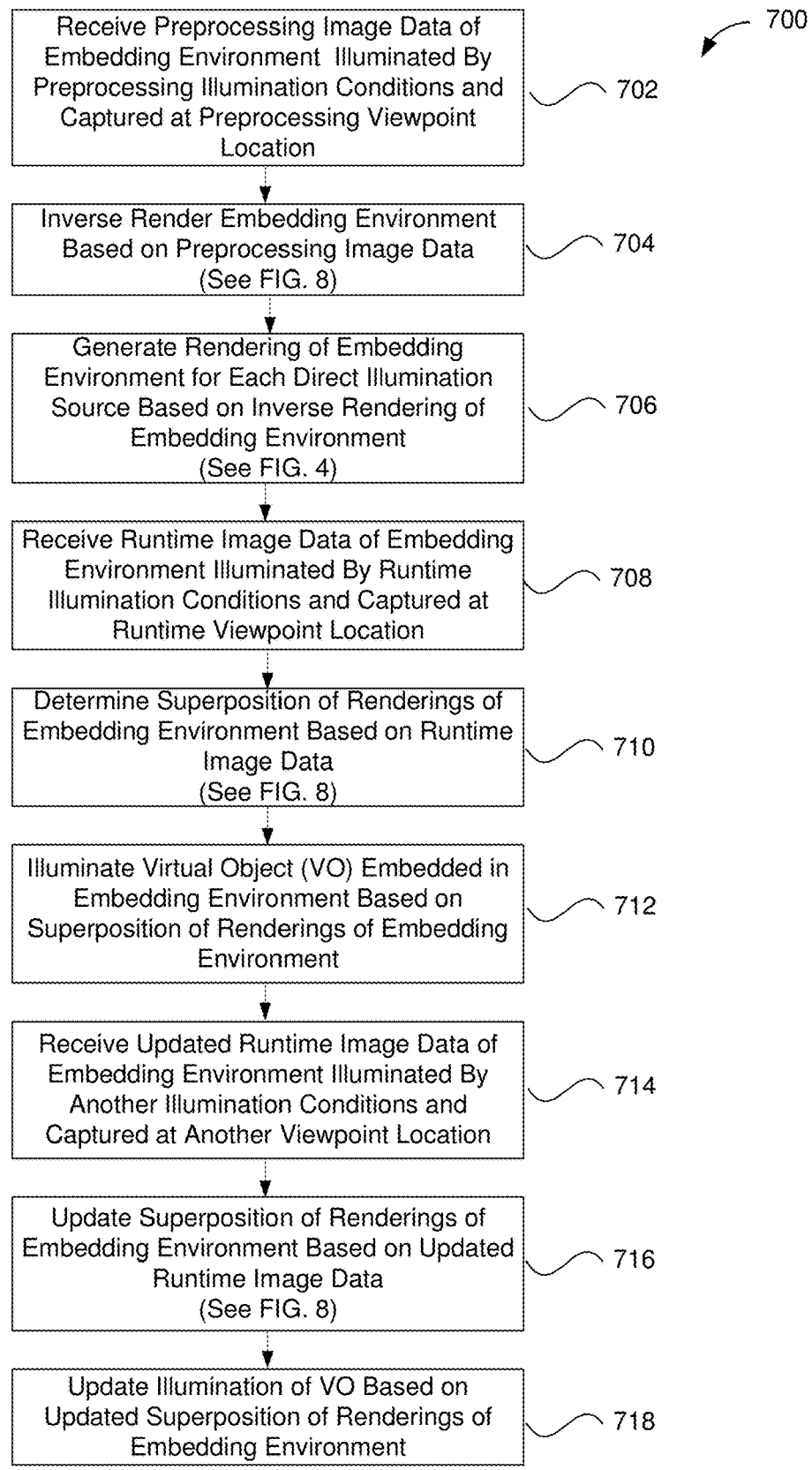
FIG. 7 illustrates one embodiment of a process flow for providing an immersive experience to a user that is consistent with the various embodiments presented herein.

FIG. 7 illustrates one embodiment of a process flow for providing an immersive experience to a user that is consistent with the various embodiments presented herein. Process 700 begins at block 702, preprocessing and/or initial image data depicting the embedding environment is captured, generated, and/or received. The embedding environment in the preprocessing image data may be illuminated via preprocessing illumination conditions. That is, the embedding environment in the preprocessing image data may be illuminated by a first combination of intensities of the direct illumination sources. The viewpoint location associated with the preprocessing image data may be at a preprocessing viewpoint location within the embedding environment.

At block 704, the embedding environment is inverse rendered based on the preprocessing image data. Various embodiments of generating an inverse rendering the embedding environment are discussed in conjunction with at least embedding environment inverse renderer (EEIR) 320 of FIG. 3 and process 800 of FIG. 8. However, briefly here, the illumination conditions depicted in the processing image data are separated and/or partitioned into direct illumination source and indirect illumination sources at block 704.

At block 706, for each partitioned direct illumination source, a rendering of the embedding environment is generated. FIG. 4 shows three such renderings: 400, 410, and 420. Embodiments for generating renderings of the embedding environment for each direct illumination source are discussed in conjunction with at least preprocessing analyzer 330 of FIG. 3. However, briefly here, a rendering of the embedding environment for a particular direct illumination source may be an illumination basis function corresponding to the particular direct illumination source.

At block 708, runtime image data depicting the embedding environment is captured, generated, and/or received. The embedding environment in the preprocessing image data may be illuminated via runtime illumination conditions. That is, the embedding environment in the runtime image data may be illuminated by a second combination of intensities of the direct illumination sources. The viewpoint location associated with the runtime image data may be at a runtime viewpoint location within the embedding environment.

At block 710, a superposition of the renderings of the embedding environment may be generated based on the runtime image data. Various embodiments for determining and/or generating a superposition of the renderings of the embedding environment are discussed in conjunction with an illumination conditions monitor 340 of FIG. 3 and process 800. However, briefly here, an illumination-weighting vector may be determined and/or generated. The components of the weighting vector encode a superposition or combination of the illumination basis functions that corresponds to the combination of intensities of the direct illumination sources that are associated with the runtime image data.

At block 712, a virtual object (VO) embedded within the embedding environment is illuminated based on the superposition of the renderings of the embedding environment. Various embodiments of generating, embedding, and illuminating a VO are discussed at least in conjunctions with virtual object component 350 of FIG. 3.

At block 714, updated runtime image data of the embedding environment is received, captured, and/or generated. The updated runtime image data may be captured at other viewpoint locations and/or under other illumination conditions. At block 716, the superposition of the renderings of the embedding environment are updated based on the updated runtime image data. At block 718, the illumination of the VO is updated based on the updated superposition of the renderings of the embedding environment.

Figure 8:
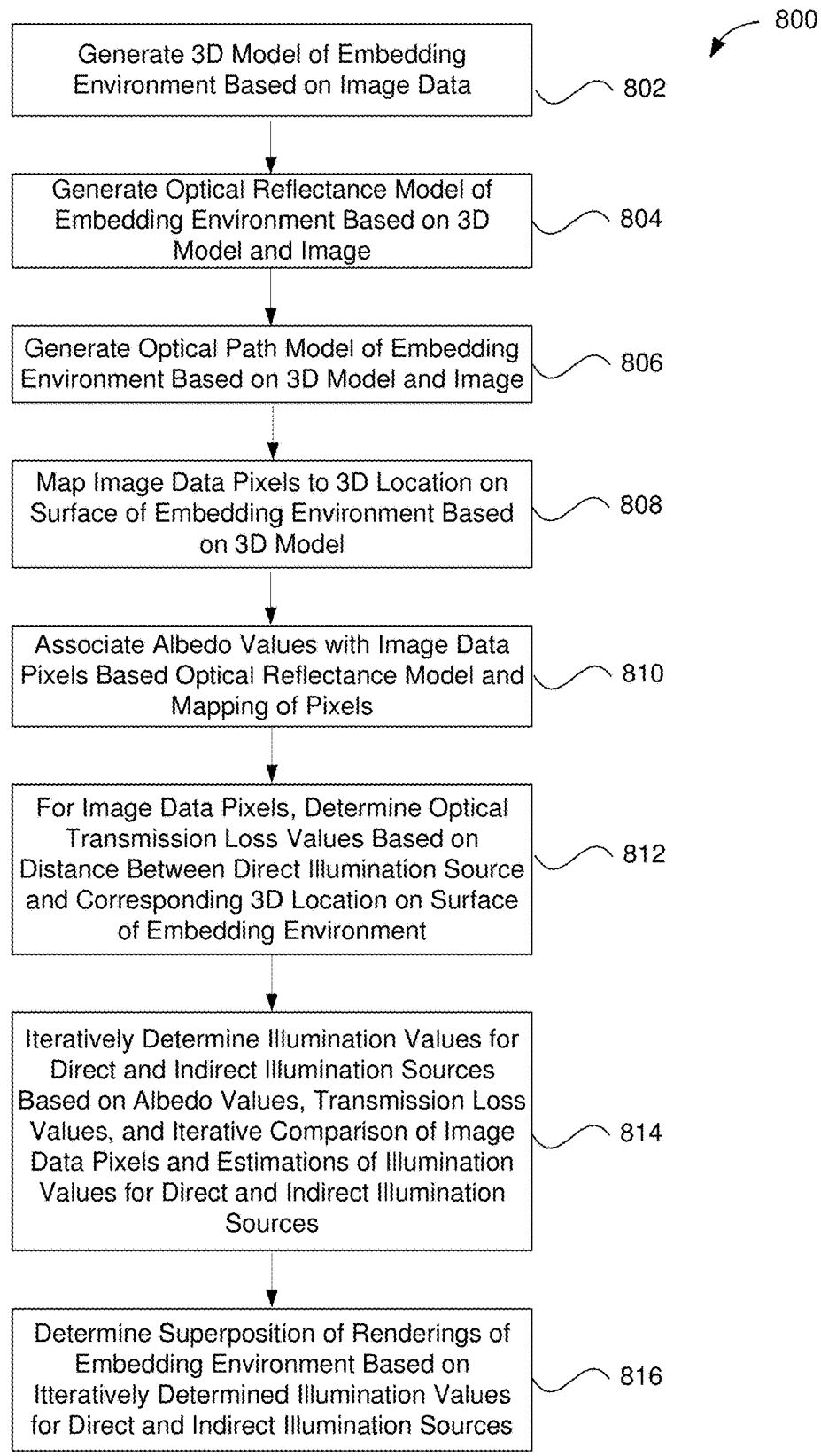
FIG. 8 illustrates one embodiment of a process flow for generating an inverse rendering of an embedding environment that is consistent with the various embodiments presented herein.

FIG. 8 illustrates one embodiment of a process flow for generating an inverse rendering of an embedding environment that is consistent with the various embodiments presented herein. Process 800 begins at block 802, a 3D model of the embedding environment is determined and/or generated based on image data. 3D geometry modeler 322 may generate a 3D model of the environment based on image data. At block 804, an optical reflectance model of the embedding environment is generated and/or determined based on image data and the 3D model. ORAT modeler 324 may generate the optical reflectance model. At block 806, an optical path model of the embedding environment may be generated based on 3D model and the image data. Optical path modeler 326 of FIG. 3 may generate the optical path model. Generating the optical path model may include determining a distance between each of the direct illumination sources and each discretized location on reflective surfaces of the embedding environment based on the 3D model and the optical reflectance model.

At block 808, each image pixel is mapped to a 3D location on a surface of the embedding model based on the 3D model. Pixel mapper 332 or pixel mapper 348 of FIG. 3 may map the pixels to the 3D locations. At block 810, an albedo value is associated or mapped to the image pixels based on the optical reflectance model and the mapping of the pixels. Pixel mapper 332 or pixel mapper 349 may associate the albedo values with the pixels. At block 812, an optical transmission loss is determined for each pixel of the image data based on the optical path model. For instance, an optical transmission loss value may be determined for a particular pixel based on a determined distance between a direct illumination source and the corresponding 3D location of the surface that is mapped to the particular pixel. The transmission loss value for the ith pixel and the jth direct illumination source may be referenced as $F_{ij}$. Pixel mapper 332 or pixel mapper 349 may determine the transmission losses.

At block 814, the illumination or intensity values for direct and indirect illuminations sources are iteratively determined. The illumination values may be determined based on the albedo values and the transmission loss values. The illumination values may be determined by an iterative comparison of the pixel values of the image data and estimated values of the pixel values. The illumination values may be determined by iteratively minimizing one or more expressions discussed herein. At block 816, the superposition of the renderings of the embedding environment may be determined based on the iteratively determined illumination values for the direct and indirect illumination sources.

Illustrative Computing Device

Figure 9:
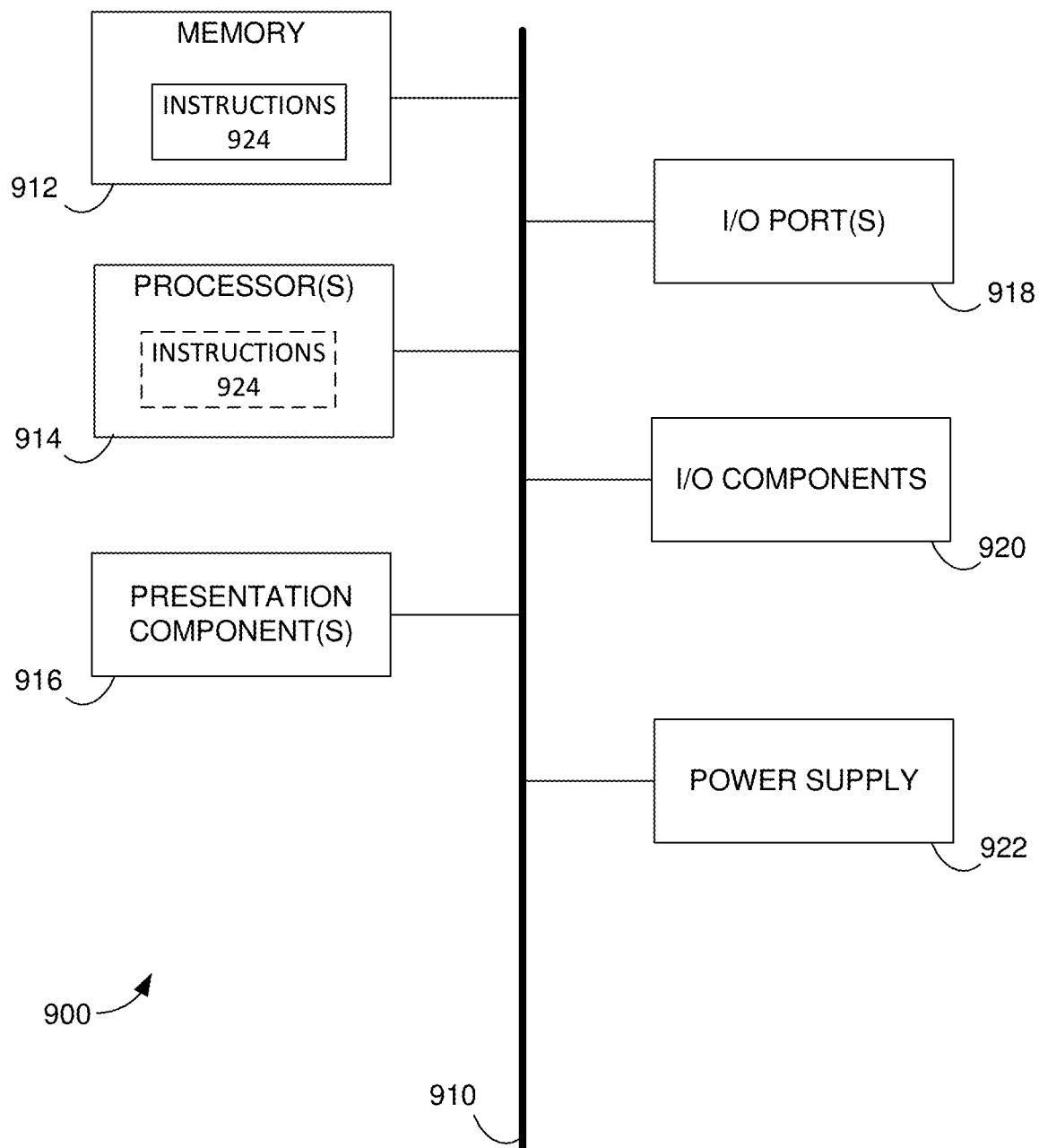
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)."

The phrase "at least one of A, B and C" means "(A), (B), (C), (A and B), (A and C), (B and C) or (A, B and C)."

What is claimed is:

1. A computer-readable storage medium having instructions stored thereon for providing an immersive experience to a user, which, when executed by a processor of a computing device cause the computing device to perform actions comprising:

determining a set of basis functions based on a first set of image data of a three-dimensional (3D) environment that is illuminated by a first combination of intensities of a set of direct illumination sources and a 3D model of the 3D environment, wherein each of the basis functions of the set of basis functions includes a rendering of the 3D environment that is illuminated by a corresponding direct illumination source of the set of direct illumination sources;

receiving a second set of image data of the 3D environment, wherein the 3D environment in the second set of image data is illuminated by a second combination of intensities of the set of direct illumination sources;

determining a weighting vector based on the second set of image data and the set of basis functions, wherein the weighting vector encodes a superposition of the renderings of the 3D environment included in the set of basis functions that corresponds to the second combination of intensities of the set of direct illumination sources; and illuminating a virtual object (VO) embedded in the 3D environment based on the weighting vector and the set of basis functions, wherein an illumination of the illuminated VO corresponds to the second combination of intensities of the set of direct illumination sources.

2. The computer-readable storage medium of claim 1, wherein the actions further comprise:

generating the 3D model of the 3D environment based on the first set of image data;

associating an albedo value with each pixel of the first set of image data based on the 3D model of the 3D environment, wherein a particular albedo value associated with a particular pixel indicates an optical reflectance at a particular location on a surface of the 3D environment that maps to the particular pixel based on the 3D map;

determining a set of illumination values that encodes the first combination of intensities of the set of direct illumination sources based on the 3D map, each albedo value associated with the pixels of the first set of image data, and illumination values of the pixels of the first set of image data; and determining the set of basis functions based on the determined set of illumination values that encodes the first combination of intensities of the set of direct illumination sources.

3. The computer-readable storage medium of claim 2, wherein the actions further comprise:

determining an optical-path value for each direct illumination source of the set of direct illumination sources and the particular pixel based on the 3D map, wherein each optical-path value is based on a distance between the corresponding direct illumination source and the particular location on the surface of the 3D environment that maps to the particular pixel;

determining the set of illumination values that encodes the first combination of intensities of the set of direct illumination sources further based on each determined optical-path value.

4. The computer-readable storage medium of claim 2, wherein each illumination value of the set of illumination values is a direct illumination value and the actions further comprise:
  determining an indirect illumination value for each pixel of the first set of image data, wherein the indirect illumination value for the particular pixel is based on combination of iterative estimates of each direct illumination value in the set of direct illumination values; and
  iteratively determining the set of direct illumination values that encodes first combination of intensities of the set of direct illumination sources further based on the indirect illumination value for each pixel of the first set of image data and the iterative estimates of each direct illumination value.

5. The one or more computer-readable storage media of claim 1, wherein the actions further comprise:
  generating a virtual shadow based on a 3D shape of the VO and the illumination of the illuminated VO; and
  embedding the virtual shadow in the 3D environment.

6. The one or more computer-readable storage media of claim 1, wherein each basis function of the set of basis functions includes another set of image data that depicts the 3D environment illuminated only by the corresponding direct illumination source and without a contribution from an indirect illumination source and other direct illumination sources of the set of direct illumination sources.

7. The one or more computer-readable storage media of claim 1, wherein each of the direct illumination sources is a point illumination source located at a particular position within the 3D environment.

8. A method for providing an immersive experience to a user, comprising:
  steps for partitioning initial illumination conditions of an environment into a set of indirect illumination sources and a set of direct illumination sources, wherein each direct illumination source of the set of direct illumination sources includes a light emitter positioned within the environment and the set of indirect illumination sources includes optical reflections of light emitted by the set of direct illumination sources from a plurality of reflective surfaces included in the environment;
  steps for generating a set of basis images, wherein each basis image of the set of basis images depicts the environment illuminated by light emitted from a corresponding light emitter of the set of direct illumination sources;
  steps for determining a vector based on current illumination conditions of the environment based on current image data of the environment, wherein each component of the vector encodes a weight corresponding to one basis image of the set of basis images;
  steps for generating a weighted combination of the set of basis images that depicts the current illumination conditions of the environment, wherein the weighted combination of the basis images is based on the components of the vector; and
  steps for illuminating a virtual object (VO) embedded in the environment based on the weighted combination of the set of basis images.

9. The method for claim 8, wherein the steps for partitioning the initial illumination conditions of the environment include:
  generating a 3D model of the environment based on initial image data of the environment, wherein the 3D model maps each pixel of the initial image data to a location on one of the plurality of reflective surfaces;
  generating an optical path model based on the 3D model and the initial image data that associates a distance between each light emitter of the set of direct illumination sources and a particular location on one of the plurality of reflective surfaces;
  determining an initial intensity for each light emitter of the set of direct illumination sources based on the initial image data, the 3D model of the environment, and the optical path model; and
  generating a basis image of the set of basis images based on the initial intensity for the corresponding light emitter of the set of direct illumination sources and the initial image data.

10. The method of claim 9, wherein the steps for partitioning the initial illumination conditions of the environment further include:
  generating an albedo model for the plurality of reflective surfaces included in the environment, wherein the albedo model associates an albedo value with each pixel of the initial image data and the associated albedo value of a particular pixel indicates an optical reflectance of a particular location on one of the plurality of reflective surfaces that the particular pixel is mapped to based on the 3D model; and
  determining the initial intensity for each light emitter of the set of direct illumination sources further based on the albedo model for the plurality of reflective surfaces.

11. The method of claim 10, wherein the steps for partitioning the initial illumination conditions of the environment further include:
  iteratively determining the initial intensity for each light emitter of the set of direct illumination sources based on iteratively updating a comparison between observed pixel values of the initial image data and estimated pixel values based on the iterative determinations of the initial intensity for each light emitter, the albedo model, and the optical path model.

12. The method of claim 10, wherein the steps for partitioning the initial illumination conditions of the environment further include:
  for each pixel of the initial image data, determining an indirect illumination contribution based on the 3D map and the albedo model; and
  determining the set of indirect illumination sources based on the indirect illumination contribution for each pixel of the initial image data.

13. The method of claim 8, further comprising:
  generating a virtual shadow based on a 3D shape of the VO and the weighted combination of the set of basis images; and
  embedding the virtual shadow and the VO in the environment.

14. The method of claim 8, further comprising:
  updating the vector based on an updated user viewpoint of the environment;
  updating the weighted combination of the set of basis images based on the updated vector; and
  updating the illuminated VO based on the updated weighted combination of the set of basis images.

15. A computing system, comprising:
  a processor device; and
  a computer-readable storage medium, coupled with the processor device, having instructions stored thereon for providing an immersive experience to a user, which, when executed by the processor device, provide the system with an immersive environment engine configured to perform actions comprising:
determining a set of basis functions based on a first set of image data of a three-dimensional (3D) environment that is illuminated by a first combination of intensities of a set of direct illumination sources and a 3D model of the 3D environment, wherein each of the basis functions of the set of basis functions includes a rendering of the 3D environment that is illuminated by a corresponding direct illumination source of the set of direct illumination sources;
receiving a second set of image data of the 3D environment, wherein the 3D environment in the second set of image data is illuminated by a second combination of intensities of the set of direct illumination sources;
determining a weighting vector based on the second set of image data and the set of basis functions, wherein the weighting vector encodes a superposition of the renderings of the 3D environment included in the set of basis functions that corresponds to the second combination of intensities of the set of direct illumination sources;
embedding a virtual object (VO) within the 3D environment; and
illuminating the VO embedded in the 3D environment based on the weighting vector and the set of basis functions, wherein an illumination of the illuminated VO corresponds to the second combination of intensities of the set of direct illumination sources.

16. The computing system of claim 15, wherein the second set of image data is generated from a first viewpoint of the 3D environment and the actions further comprising:
receiving a third set of image data of the 3D environment, wherein the third set of image data is generated from a second viewpoint of the 3D environment;
updating the weighting vector based on the third set of image data; and
updating the illumination of the VO embedded in the 3D environment based on the updated weighting vector.

17. The computing system of claim 15, the actions further comprising:
generating the 3D model of the 3D environment based on the first set of image data;
associating an albedo value with each pixel of the first set of image data based on the 3D model of the 3D environment, wherein a particular albedo value associated with a particular pixel indicates an optical reflectance at a particular location on a surface of the 3D environment that maps to the particular pixel based on the 3D map;
determining an optical-path value for each direct illumination source of the set of direct illumination sources and the particular pixel based on the 3D map, wherein each optical-path value is based on a distance between the corresponding direct illumination source and the particular location on the surface of the 3D environment that maps to the particular pixel;
iteratively determining the first combination of intensities of the set of direct illumination sources based on the 3D map, each albedo value associated with the pixels of the first set of image data, each determined optical-path value, and illumination values of the pixels of the first set of image data; and
determining the set of basis functions based on the iteratively determined first combination of intensities of the set of direct illumination sources.

18. The computing system of claim 15, the actions further comprising:
generating a virtual shadow based on a 3D shape of the VO and the illumination of the illuminated VO; and
embedding the virtual shadow in the 3D environment.

19. The computing system of claim 15, wherein the 3D environment includes a virtual reality (VR) environment.

20. The computing system of claim 15, wherein the 3D environment includes an augmented reality (AR) environment.

* * * * *